US011703673B2

(12) United States Patent
Kapanidis et al.

(10) Patent No.: US 11,703,673 B2
(45) Date of Patent: *Jul. 18, 2023

(54) COMPACT MICROSCOPE

(71) Applicant: OXFORD UNIVERSITY INNOVATION LIMITED, Oxford (GB)

(72) Inventors: Achillefs Kapanidis, Oxford (GB); Bo Jing, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 351 days.

This patent is subject to a terminal disclaimer.

(21) Appl. No.: 17/075,204

(22) Filed: Oct. 20, 2020

(65) Prior Publication Data

US 2021/0041682 A1 Feb. 11, 2021

Related U.S. Application Data

(63) Continuation of application No. 15/568,213, filed as application No. PCT/GB2016/051152 on Apr. 25, 2016, now Pat. No. 10,962,755.

(30) Foreign Application Priority Data

Apr. 24, 2015 (GB) .................................... 1507021

(51) Int. Cl.
*G02B 21/26* (2006.01)
*G02B 21/24* (2006.01)
(Continued)

(52) U.S. Cl.
CPC ............. *G02B 21/26* (2013.01); *G02B 21/04* (2013.01); *G02B 21/125* (2013.01); *G02B 21/16* (2013.01);
(Continued)

(58) Field of Classification Search
CPC ................ G02B 21/00; G02B 21/0004; G02B 21/0032; G02B 21/02; G02B 21/04;
(Continued)

(56) References Cited

U.S. PATENT DOCUMENTS 4,893,914 A   1/1990   Hancock et al.
6,169,289 B1  1/2001   White et al.
(Continued)

FOREIGN PATENT DOCUMENTS

CN   2465197 Y   12/2001
CN   1782777 A    6/2006
(Continued)

OTHER PUBLICATIONS

Notice of Allowance, U.S. Appl. No. 16/405,226, dated Apr. 16, 2021 (10 pp.).
(Continued)

*Primary Examiner* — Stephone B Allen
*Assistant Examiner* — Adam W Booher
(74) *Attorney, Agent, or Firm* — Eversheds Sutherland (US) LLP

(57) ABSTRACT

A compact microscope including an enclosure, a support element, a primary optical support element located within the enclosure and supported by the support element, at least one vibration isolating mount between the support element and the primary optical support element, a sample stage supported on the primary optical support element to support a sample, a return optical system to receive returned light from a sample and transmit returned light to a detection apparatus, wherein the return optical system is mounted on the primary optical support element, and wherein the compact microscope include a at least one of the following elements; a) an objective lens system, b) a temperature-control system, and c) the return optical system being
(Continued)

operable to separate returned light into at least a first wavelength band and a second wavelength band.

18 Claims, 25 Drawing Sheets

(51) Int. Cl.
  *G02B 21/36* (2006.01)
  *G02B 21/16* (2006.01)
  *G02B 21/04* (2006.01)
  *G02B 21/12* (2006.01)
  *G02B 21/28* (2006.01)

(52) U.S. Cl.
  CPC .............. *G02B 21/24* (2013.01); *G02B 21/28* (2013.01); *G02B 21/361* (2013.01); *G02B 21/362* (2013.01)

(58) Field of Classification Search
  CPC ...... G02B 21/06; G02B 21/08; G02B 21/082; G02B 21/125; G02B 21/16; G02B 21/18; G02B 21/24; G02B 21/26; G02B 21/28; G02B 21/36; G02B 21/361; G02B 21/362; G02B 27/10; G02B 27/1006; G02B 27/1013; G02B 27/14; G02B 27/141; G01J 3/12; G01J 3/28; G01J 3/2803; G01J 3/42; G01J 3/427; G01J 2003/126; G01J 2003/2806–282
  See application file for complete search history.

(56) References Cited

U.S. PATENT DOCUMENTS

| | | | |
|---|---|---|---|
| 7,706,597 | B2 | 4/2010 | Yoneyama et al. |
| 7,897,942 | B1 | 3/2011 | Bareket et al. |
| 10,330,904 | B2 | 6/2019 | Kapanidis et al. |
| 10,962,755 | B2* | 3/2021 | Kapanidis ............. G02B 21/26 |
| 2003/0103662 | A1 | 6/2003 | Finkbeiner |
| 2003/0142398 | A1 | 7/2003 | Leblans |
| 2004/0004614 | A1 | 1/2004 | Bacus et al. |
| 2004/0085627 | A1 | 5/2004 | Okamura et al. |
| 2005/0105172 | A1 | 5/2005 | Hasegawa et al. |
| 2007/0070498 | A1 | 3/2007 | Endo et al. |
| 2007/0258084 | A1 | 11/2007 | Fukui |
| 2008/0192339 | A1 | 8/2008 | Kubo |
| 2008/0247038 | A1 | 10/2008 | Sasaki et al. |
| 2008/0259443 | A1 | 10/2008 | Smith et al. |
| 2009/0316146 | A1 | 12/2009 | Beardsley et al. |
| 2009/0316258 | A1 | 12/2009 | Uhl |
| 2010/0033811 | A1 | 2/2010 | Westphal et al. |
| 2010/0111768 | A1 | 5/2010 | Banerjee et al. |
| 2010/0238442 | A1* | 9/2010 | Heng ................. G01N 15/1475 382/294 |
| 2010/0315708 | A1 | 12/2010 | Amberger et al. |
| 2011/0051232 | A1 | 3/2011 | Steinhorn et al. |
| 2011/0317259 | A1 | 12/2011 | Tanabe et al. |
| 2012/0080616 | A1 | 4/2012 | Schoenborn |
| 2012/0175495 | A1 | 7/2012 | Marshall |
| 2012/0200693 | A1 | 8/2012 | Lippert et al. |
| 2013/0147916 | A1 | 7/2013 | Bennett et al. |
| 2014/0233098 | A1 | 8/2014 | Bresolin et al. |

FOREIGN PATENT DOCUMENTS

| | | |
|---|---|---|
| CN | 102782557 A | 11/2012 |
| EP | 1666947 A2 | 6/2006 |
| EP | 1 930 717 A1 | 11/2008 |
| GB | 2 299 236 A | 9/1996 |
| JP | H11149045 A | 6/1999 |
| JP | 2001311866 A | 11/2001 |
| JP | 2003241079 A | 8/2003 |
| JP | 2005326495 A | 11/2005 |
| JP | 2006162765 A | 6/2006 |
| JP | 2007127524 A | 5/2007 |
| JP | 2007183435 A | 7/2007 |
| JP | 2008225454 A | 9/2008 |
| JP | 2013156510 A | 8/2013 |
| WO | 9621160 A1 | 7/1996 |
| WO | 9807022 A1 | 2/1998 |
| WO | 2007144197 A1 | 12/2007 |
| WO | 2008019298 A2 | 2/2008 |
| WO | 2014080932 A1 | 5/2014 |
| WO | 2015059682 A1 | 4/2015 |

OTHER PUBLICATIONS

Extended Search Report, EP 21154265.9, dated Apr. 15, 2021 (8 pp.).

* cited by examiner

COMPACT MICROSCOPE

RELATED APPLICATIONS

The present application is a continuation of U.S. application Ser. No. 15/568,213, filed on Oct. 20, 2017, now allowed. U.S. application Ser. No. 15/568,213 is incorporated by reference herein in full.

BACKGROUND TO THE INVENTION

Optical microscopy and spectroscopy includes a large number of techniques and applications. Example techniques include differential interference contrast, phase contrast and dark field microscopy, absorption microscopy, coherent interferometric microscopy, Raman spectroscopy and microscopy, and fluorescence based techniques, such as fluorescence resonance energy transfer (FRET) spectroscopy, fluorescence life-time imaging, fluorescence polarization and anisotropy microscopy, multi-colour, alternating-laser excitation microscopy, single-particle localization and structured illumination based super-resolution microscopy.

For many applications, the microscope system must be extremely stable, protected from vibration and other external influences, precisely aligned and controlled, able to detect extremely weak signals, and safe to operate. Commercially available systems and bespoke microscopy systems for specific applications can be expensive and have large dimensions and weight. They are not portable and require substantial infrastructure, maintenance costs, operator training and custom software. Existing systems therefore incur a substantial total cost of ownership.

SUMMARY OF THE INVENTION

According to a first aspect of the invention there is provide a compact microscope comprising an enclosure, a support element, a primary optical support element located within the enclosure and supported by the support element, at least one vibration isolating mount between the support element and the primary optical support element, a sample stage supported on the primary optical support element to support a sample, and a return optical system to receive returned light from a sample and transmit returned light to a detection apparatus, wherein the return optical system is mounted on the primary optical support element, and wherein the compact microscope comprises at least one of the following elements;

a) an objective lens system, the objective lens system being supported on the primary optical support element, an illumination section and an illumination optical system to direct an illumination light beam from the illumination section to the sample stage, and a mirror disposed above the sample stage, the illumination optical system being arranged to direct light through the objective lens system to the mirror;

b) a temperature-control system, the temperature control system comprising a temperature control circuit comprising a plurality of fluid-carrying channels within at least one of the enclosure and the primary optical support element; and c) the return optical system being operable to separate returned light into at least a first wavelength band and a second wavelength band, and the detection apparatus comprising an imaging apparatus, the return optical having a first tube lens to focus returned light in a first wavelength band to a first area of the imaging apparatus and a second tube lens to focus returned light in a second wavelength band to a second area of the imaging apparatus.

Where the compact microscope comprises element (a), the enclosure may have a hatch, the mirror being supported by the hatch.

The illumination optical system may be operable to focus the illumination light beam such that the illumination light beam is collimated after passing through the objective lens.

The illumination optical system may be operable to focus the illumination light beam such that the illumination light beam is focused on a sample after passing through the objective lens.

Where the compact microscope comprises element (b), the temperature control circuit may comprise a temperature control fluid inlet and a temperature control fluid outlet connected to the plurality of channels.

The enclosure may be provided with a first temperature control circuit and the primary optical support element may be provided with a second temperature control circuit.

An outlet of the second temperature control circuit may be connected to the first temperature control circuit.

The detection apparatus may comprise a cooling element, a cooling fluid inlet and a cooling fluid outlet.

An inlet of the second temperature control circuit may be connected to the cooling fluid outlet of the detection apparatus.

Where the compact microscope comprises element (c), the compact microscope may further comprise first mirror element to direct light from the first tube lens to the first area of the imaging apparatus and a second mirror element to direct light from the second tube lens to the second area of the imaging apparatus.

The first mirror element and second mirror element may be close to the imaging apparatus.

The compact microscope may further comprise abeam stop adjacent the mirror elements to block undesired parts of the returned light.

Where the compact microscope comprises element (c) the first tube lens and second tube lens may be independently moveable.

The illumination source may comprise a laser source.

The compact microscope may further comprise an optical fibre to transmit light from the laser source, the compact microscope comprising a homogeneous light generator, the homogeneous light generator comprising a fan having a plurality of blades and an optical fibre support, the optical fibre support suspending a part of the optical fibre such that the part of the optical fibre is by the blades when the fan rotates.

BRIEF DESCRIPTION OF THE DRAWINGS

An embodiment of the invention is described byway of example only with reference to the accompanying drawings, wherein.

DETAILED DESCRIPTION OF THE PREFERRED EMBODIMENTS

Figure 1:
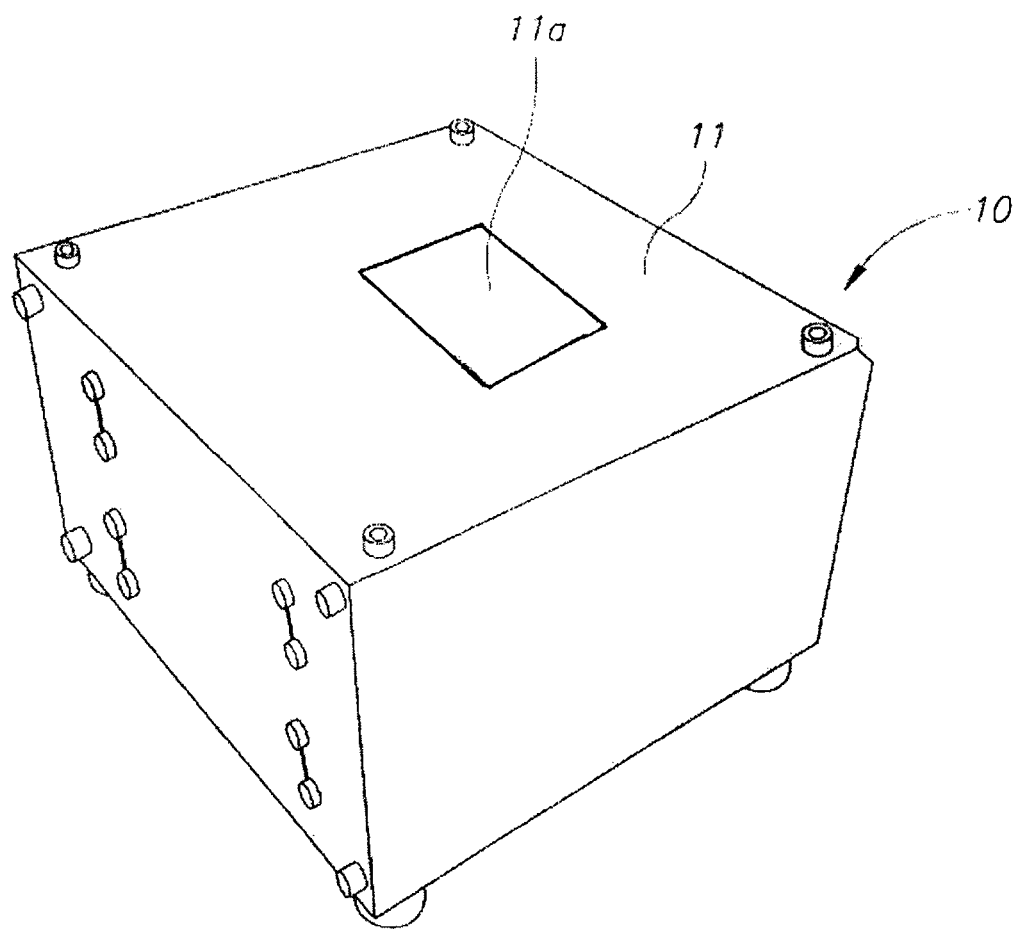
FIG. 1 is a perspective view of a compact microscope embodying the present invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

First Example

A compact microscope embodying the present application is generally shown at 10 in FIG. 1. The microscope 10 has an enclosure 11, completely enclosing the optical paths of the microscope. The enclosure 11 comprises a hatch 11a to provide access to a sample stage as described below. Preferably the side and top walls of the enclosure 11 are removable to allow access to the components within the microscope 10. In this example, the enclosure 11 is extremely compact, having a length of 24 cm, a depth of 21.5 cm and a height of 15 cm, giving the microscope a footprint area approximately that of an A4 sheet of paper, and a volume of about 8 litres. It is envisaged that further reduction of the unused space within the enclosure 11 would allow the size of the microscope could be reduced further, to 23 cm×16 cm×15 cm without other major design changes, and may be even further minimised with suitable design of the components and optical paths. The portability allows the microscope to be easily repositioned or relocated, or even located in a controlled environment such as a refrigerator, or an incubator with special atmospheric compositions, for example controlled levels of $CO_2$ for pH-sensitive mammalian cell cultures.

The hatch 11a may be interlocked to cut off the illumination section or prevent its operation when the hatch is open. Providing that the enclosure 11 prevents the escape of light from within the microscope, the microscope can therefore be a Class I laser product and therefore may be used anywhere, and not restricted to for example laser controlled areas.

Figure 2:
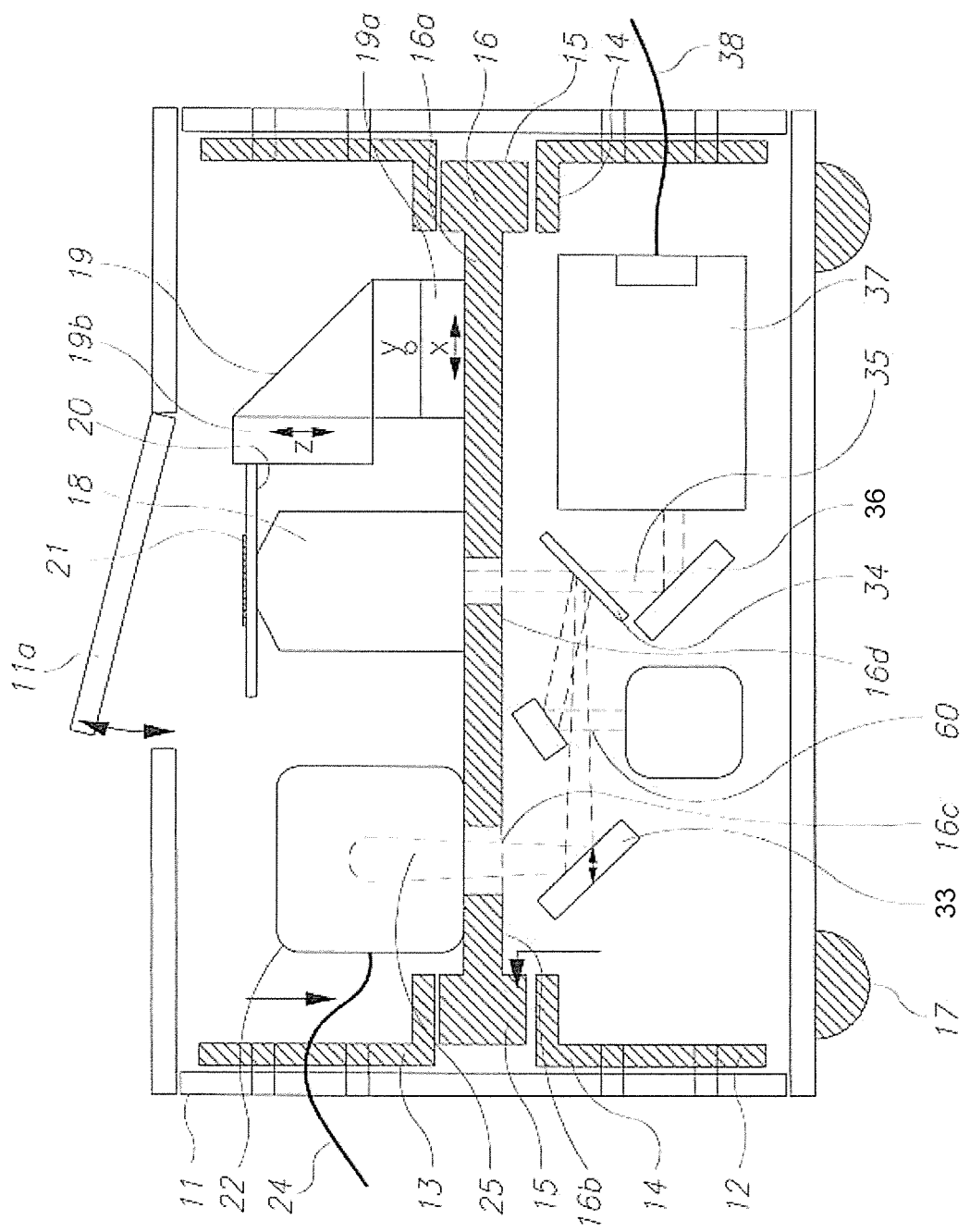
FIG. 2 is a diagrammatic sectional view of the compact microscope of FIG. 1.

A sectional view of the microscope 10 is shown in FIG. 2. Located within the enclosure 11 is a support element generally shown at 12. In this example, the support element 12 comprises a plurality of uprights 13 with mount holders 14 generally at the midpoints of uprights 13. Although the support element 12 is a discrete structure in this example, the support element could be provided integrally with the enclosure 11.

To support the optical components, a primary optical support element 16 is provided. The primary optical support element 16 is preferably a single contiguous and compact piece of dimensionally stable material, for example an aluminium, titanium or Invar block, fabricated from carbon fibre or otherwise. The primary optical support element 16 in this example is a generally rectangular plate, although any other geometry or irregular shape may be used as appropriate, for example to accommodate other components or systems within the enclosure 11. The primary optical support element 16 may also be cast or machined with holders for the optical components already in place or integrally provided, to increase stability and reduce the possibility of misalignment of the components.

The primary optical support element 16 is supported on uprights 13 through vibration isolating mounts 15 held in the mount holders 14 of the uprights 13. In this example, the vibration isolating mounts 15 comprise gel polymer patches, but any suitable mount may be used, to provide adequate vibration isolation. In addition, the enclosure 11 is provided with rubber feet 17 to engage a supporting surface, to further reduce transmitted vibrations. If desired, other vibration isolation components may be provided, or indeed the enclosure 11 and/or the support element 12 or parts thereof may comprise vibration isolating material. As shown in the alternative of FIG. 2b, a primary optical support element 16' is supported on gel-coated titanium rods 15' which are received in channels 16a' in the primary optical support element 16'. The ends 15a' of the rods 15' are received in rubber mounts 17' supported in recesses 18' on the internal face of enclosure 12'. In a further alternative, the primary optical support element may be supported by active vibration isolation components, such as regulated air pistons.

In this example, the gel polymer patches 15 act as a low-pass damping material with a frequency cut-off of approximately 10 Hz. The length and width of the primary support structure 16 is chosen to be small while keeping a moderate thickness of the material to push modal frequencies to well above 1 kHz, for example if aluminium is used for the primary support structure. The camera in this embodiment has a full frame readout frequency of 100 Hz. Therefore, due to the different order of magnitude of these characteristic frequencies, external forces do not efficiently excite any modal frequencies, and the amplitude of any excitations are small due the high modal frequencies, and any vibrations at the modal frequencies are inconsequential for the data acquisition time scale of the camera.

As is apparent from FIG. 2, components may be mounted on opposite sides of the primary optical support element 16. The primary optical support element has a first, uppermost side 16a and a second, lowermost side 16b. Mounted on the first, uppermost side 16a are an objective lens system 18 and a sample stage 19. The sample stage 19 is positioned to support a sample holder 20 above the objective lens 18 to enable a sample 21 to be imaged. The sample stage 19 has a transverse positioner 19a, to allow the sample 21 to be moved in the x-y plane, and a z-axis positioner 19b to enable the sample holder 20 to be moved vertically relative to the objective lens system 18. The positioners 19a, 19b are preferably piezoelectric friction drives which have low mechanical drift and backlash, and may be controlled automatically with nanometre precision over relatively large distances (several cm), allowing a large number of areas of a sample to be imaged. Piezoelectric friction drives allow nanometre scale steps to be made, the steps being in the range of approximately 1 to 100 nm depending on the drive used. This makes the microscope suitable for automated operation, where the transverse position is operable to successively bring different areas of the sample into the field of view of the objective lens to automatically take a large number of measurements. In addition to focusing the microscope, control of the z-axis position also allows measurements to be taken on different planes, for example through a cell.

Figure 2A:
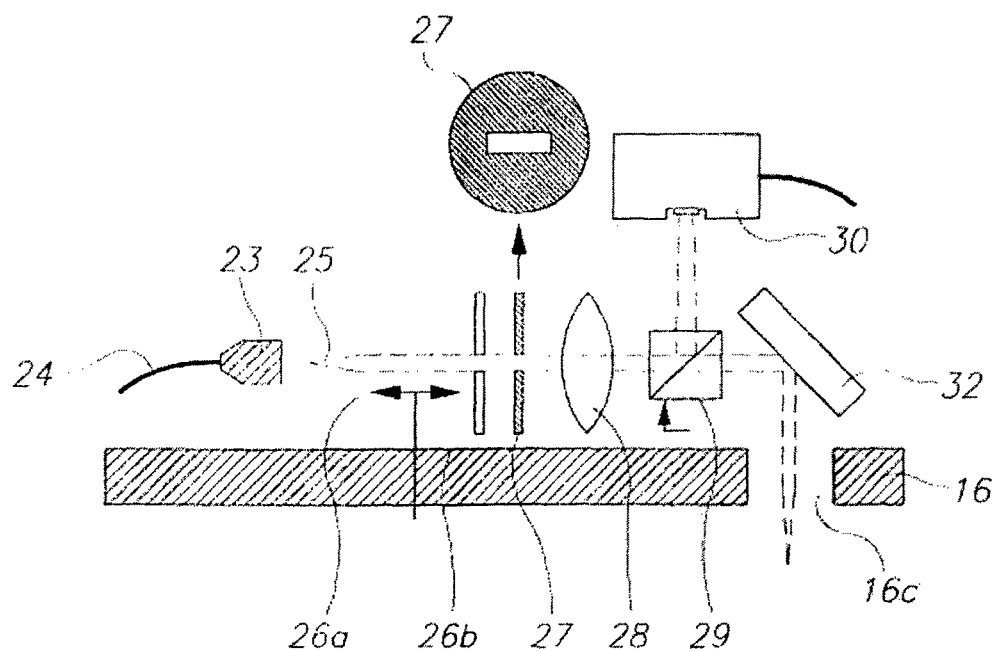
FIG. 2a is an illustration of an illumination section of the compact microscope of FIG. 2.
Figure 2B:
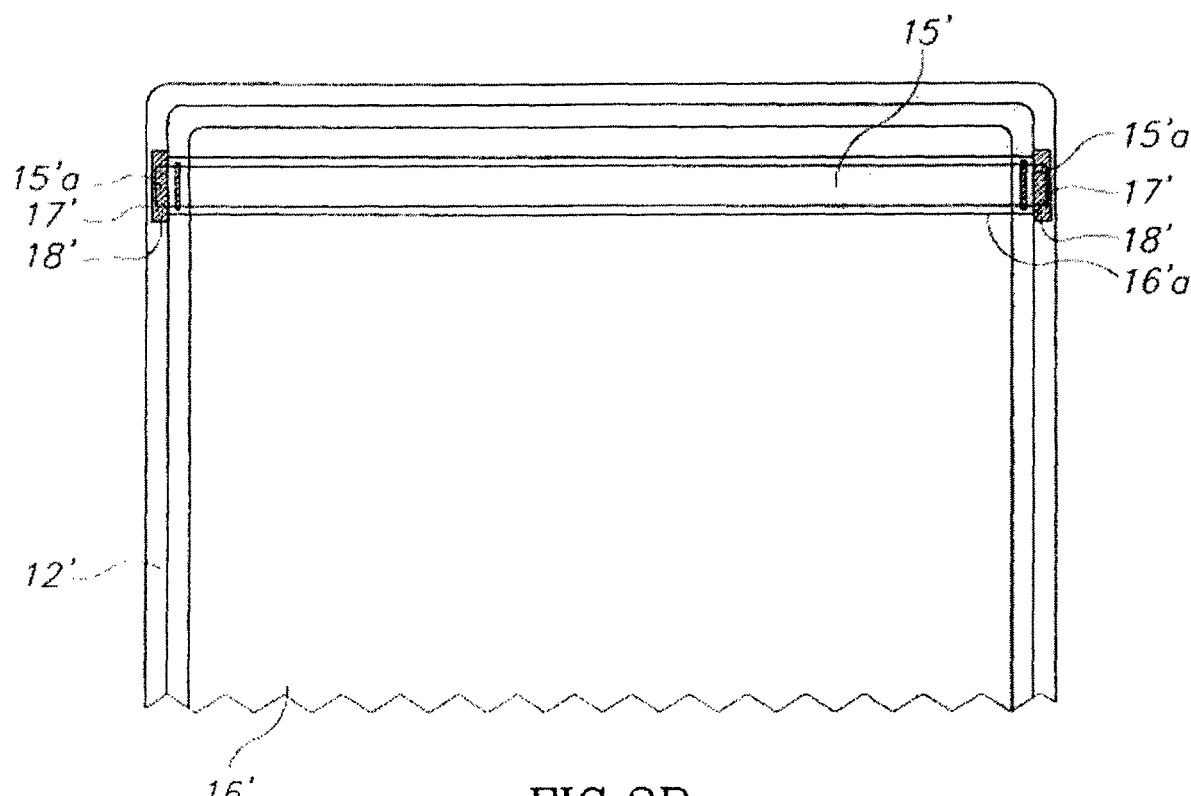
FIG. 2b is a plan view of an alternative support for a primary optical support element for the compact microscope of FIG. 1.

An illumination section is generally shown at 22 and in more detail in FIG. 2a, mounted on the first side 16a of the primary optical support element 16. The illumination section 22 may comprise a laser, an LED or a lamp, or multiple sources, or, as in this example, may include a connection to receive an optical fibre for connection to a separate illumination source module. By using a separate illumination source module, the microscope can be adapted for different techniques or applications by providing different sources. As shown in FIG. 2a, optical fibre connector 23 receives and holds optical fibre 24. Illumination light beam 25 is passed through cylindrical lenses 26a, 26b to shape and collimate the beam. Adjustable aperture 27 shapes the beam further, and wide field lens 28 then provides a converging beam focused on the rear focal plane of the objective lens system 18. Beam splitter 29 diverts approximately <10% of the light to power meter 30 to allow the beam power to be monitored and noise in the resulting data caused by beam intensity fluctuations to be lowered. Mirror 32 then directs the illumination light beam 25 through aperture 16c. As discussed below, for some applications it is desirable to adjust or replace the lens 28 to provide a collimated or divergent illumination beam, or an illumination beam focused at some other point in the optical path.

On the second, lower side 16b of primary optical support element 16, mirrors 33, 34 direct the illumination light beam 25 through aperture 16d to the objective lens system 18, where the illumination light beam 25 is focused on the back focal plane of the objective lens system 18 for wide field imaging to evenly illuminate the sample 21, or is focused on sample 21 by the objective lens system 18 via collimated light entering the back aperture of the objective lens system 18, for confocal microscopy. The illumination section 22, and mirrors 33, 34 are referred to collectively as the illumination optical system. For other applications, other components may be used in the illumination optical system. For example, mirror 34 may be a dichroic mirror, a beam splitter, a miniaturized mirror, or omitted completely. The mirror 33 can be moveable or translatable to change the illumination angle, for example for total internal reflection microscopy.

Returned light from the sample 21 is generally shown at 35. The returned light passes through mirror 34. If mirror 34 is a dichroic mirror, the characteristics of the dichroic mirror 34 are selected such that the wavelengths or wavelength range of the illumination light beam 25 are reflected, but returned light passes through. After mirror 34, the returned light is directed by mirror 36 to detection apparatus 37. Detection apparatus 37 includes a suitable detector or camera (or more than one detector or camera as needed) and the appropriate optical components for the required application. The detection apparatus has a connection 38 to allow data to be transmitted to a control system or computer. The optical components to direct returned light to the detection apparatus, and the optical components within the detection apparatus, are collectively referred to as a return optical system. For other applications, other components may be used in the return optical system.

In this example, by mounting the components on a single primary optical support element, close to the primary optical support element surface, and supporting the primary optical support element on vibration isolating mounts, the microscope has greatly reduced susceptibility to external forces and variations in temperature and other ambient conditions. Use of both sides of the primary optical support element for the optical paths, and using a beam height close to the primary optical support element surface, enables the components to be included in a relatively compact volume. In the present example, the beam heights are between about 10 mm and about 30 mm from the primary optical support element surface. Mounting the objective lens and sample holder on one side of the primary optical support element and at least part of the illumination and return optical systems on the opposite side reduces spurious optical reflections from entering the return beam path. The location of optics on both sides of the primary optical support element allows all components to remain accessible.

Figure 3A:
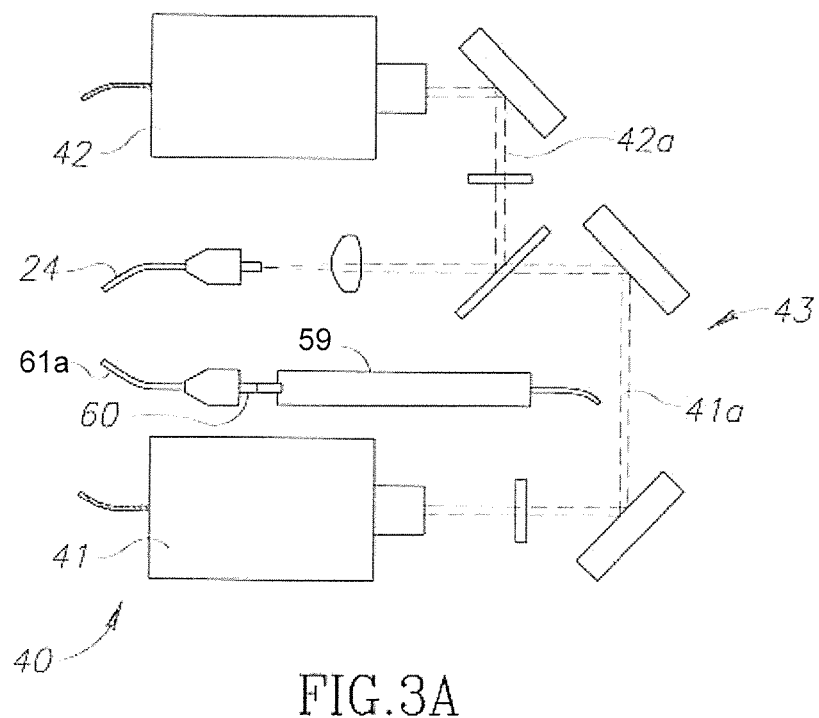
FIG. 3a is a diagrammatic illustration of an illumination source module for use with the compact microscope of FIG. 1, FIGS. 3b and 3c are alternative examples of return light paths for dual-colour wide-field fluorescence microscopy, FIG. 4. is a perspective view of beam paths within the compact microscope of FIG. 1 for use in dual-colour wide-field fluorescence microscopy.
Figure 3B:
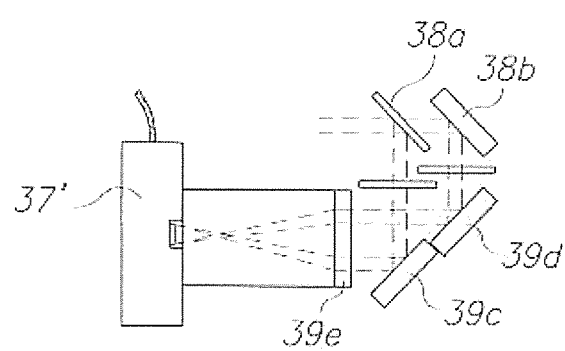
Figure 3C:
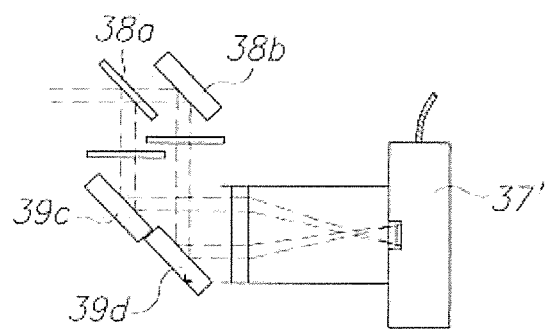
Figure 4:
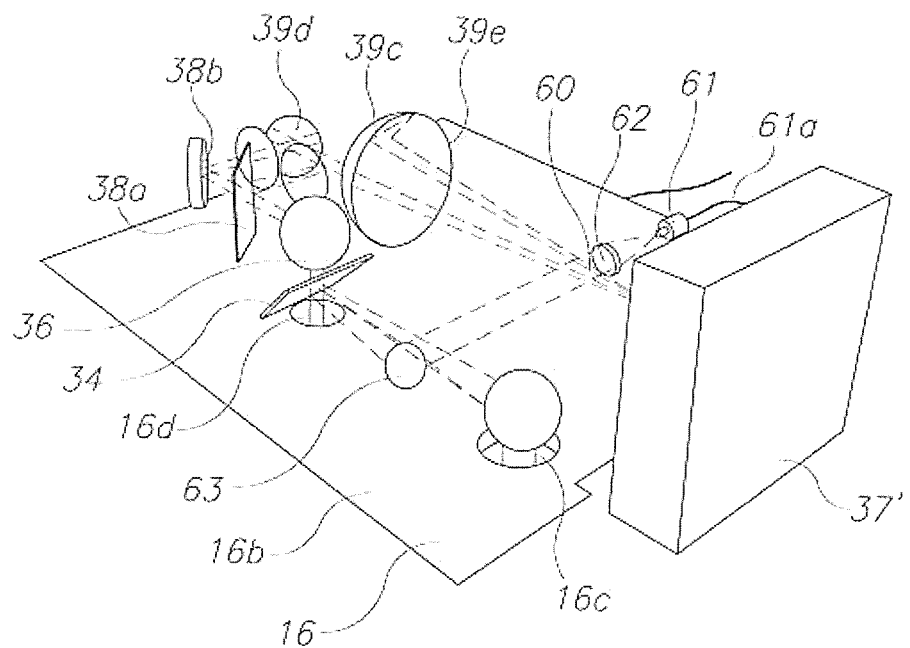
Figure 5:
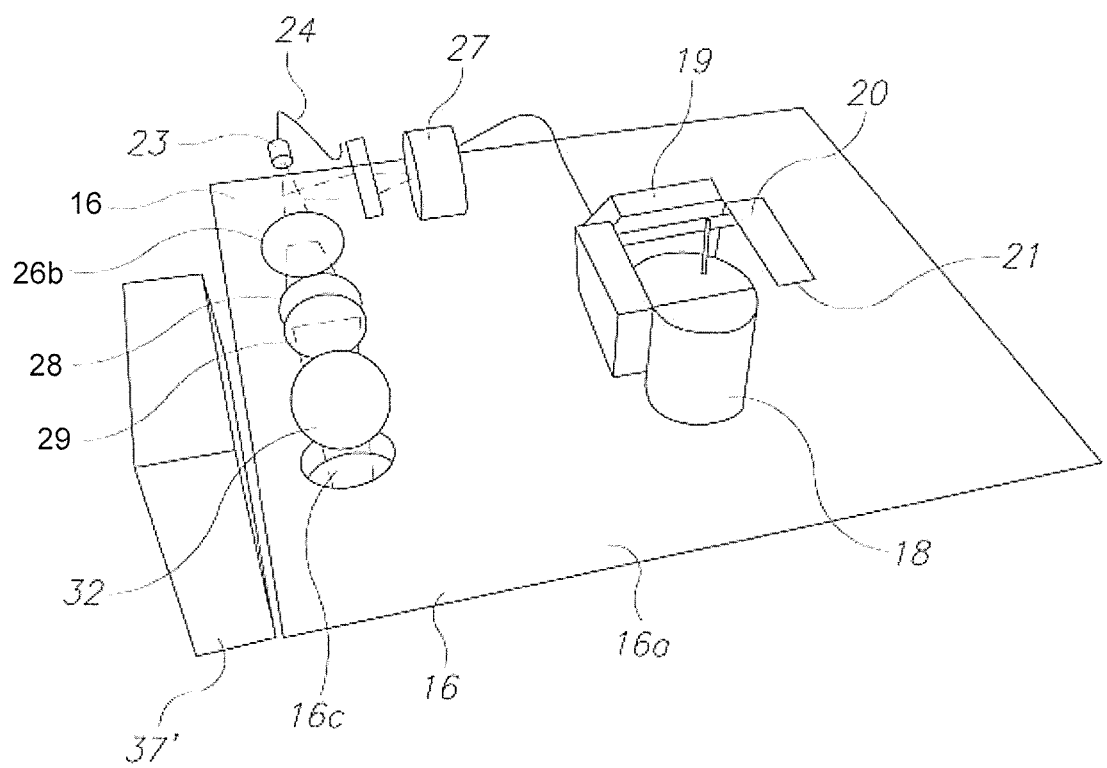
FIG. 5 is a perspective view of further beam paths within the compact microscope of FIG. 4.
Figure 6:
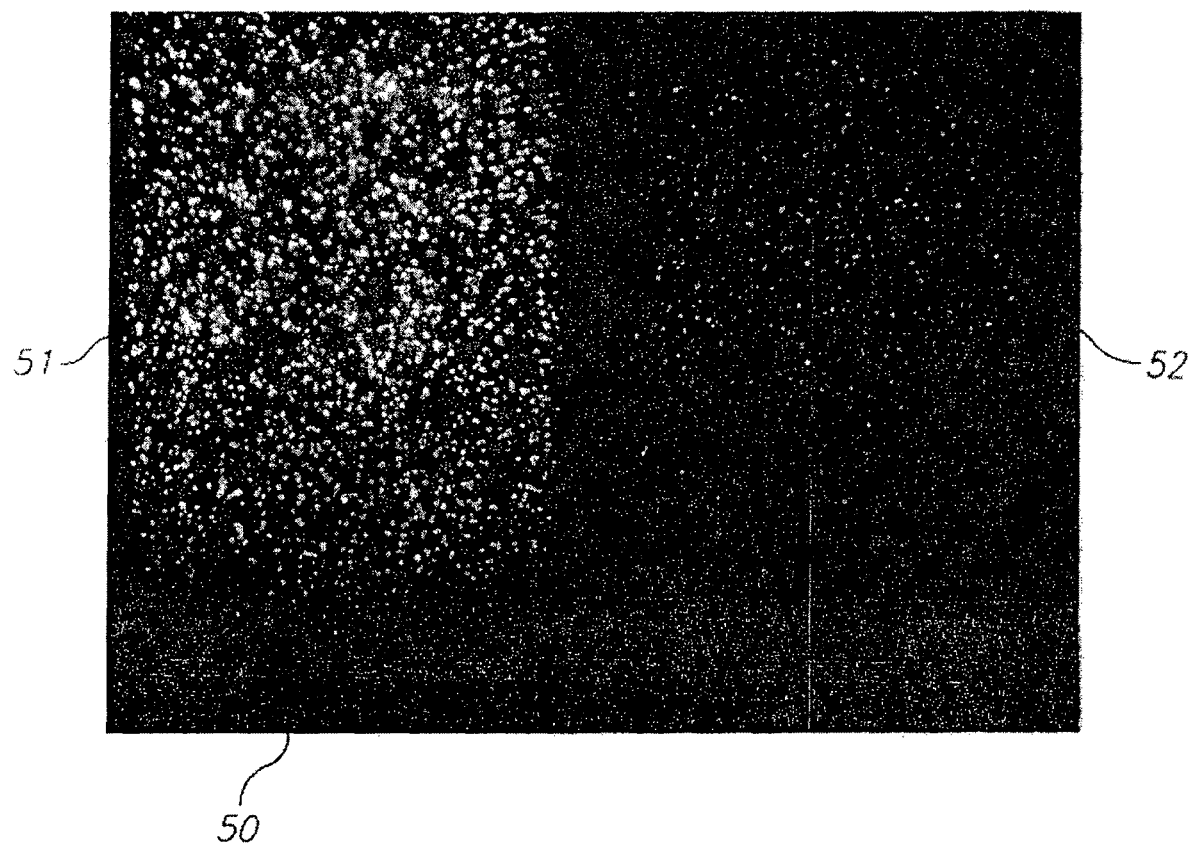
FIG. 6 is an example of an image formed at the imaging apparatus in the compact microscope of FIGS. 4 and 5, FIGS. 7a and 7b are perspective view of another compact microscope embodying the present invention.

The configuration shown in FIGS. 2 and 2a is a general configuration and may be adapted for use with a desired microscopy technique. By way of example, a configuration for a dual-colour wide-field fluorescence microscope will now be described with reference to FIGS. 3a to 6. FIG. 3a is a diagram of an illumination source module, FIGS. 3b and 3c show alternative simple return optical systems, and FIGS. 4 and 5 are perspective views of the beam paths within the microscope 10. Elements equivalent to those in FIGS. 2 and 2a are labelled with the same reference number.

In dual-colour wide-field fluorescence microscopy, sample 21 is labelled with fluorescent molecules which absorb light at one of two excitation wavelengths and then fluoresce. The illumination light beam is thus more accurately regarded as an excitation light beam in this embodiment.

As seen in FIG. 3a, an illumination source module is generally shown at 40. The illumination source module 40 comprises a first laser source 41 to generate a first illumination light beam 41a having a first wavelength and a second laser source 42 to generate a second illumination light beam 42a having a second wavelength. A beam combination optical system 43 combines the first illumination light beam 41a and second illumination light beam 42a and couples the light into the optical fibre 24. In this example the first wavelength is 640 nm and the second wavelength is 532 nm. The illumination light beams 41a, 42a may be pulsed for alternating laser excitation microscopy, with the pulses timed so that the pulses of the beams do not overlap. Optionally, the illumination source module 40 may have a power meter in place of, or in addition to, power meter 27. FIG. 3a also shows a focus stability beam source 59 for generating a focus stability beam 60, coupled into single-mode optical fibre 61a as discussed in more detail below. For dual-colour microscopy, both illumination beams may be on simultaneously. Excitation clean-up filters are located in the beam lines to pass only the main illumination laser wavelengths.

The detection apparatus in FIGS. 3b to 5 comprises a 2D camera, in this example a CMOS camera 37', although a CCD or EMCCD camera may be used depending on the application. The return optical path comprises optical elements to separate the returned light by wavelength. As shown in FIG. 5, the illumination optical path is substantially as shown in FIG. 2a.

The path of the return light is illustrated in FIGS. 3b and 4. Returned light passes through mirror 34, in this application a dichroic mirror, and is directed by mirror 36. The beam then passes through separation dichroic mirror 38a. The separation dichroic mirror 38a reflects the green fluorescence light with wavelength in the range 545 nm-620 nm in the returned light. The red wavelengths >656 nm pass through and are reflected by mirror 38b. The red and green returned light beams are directed to different areas of the CMOS camera 37'. In the examples of FIGS. 3b and 4, the green and red beams are separately reflected towards the CMOS camera 37' by separate mirrors 39c, 39d, through focusing lens 39e. The green and red beams in this example cross each other before the camera 37', so that the beams go through the lens 39e closer to its centre, causing less aberration. The mirrors 38a, 38b, 39c, 39d allow the controllable positioning of the images on different areas of the CMOS camera 37'. An example of a frame obtained by the CMOS camera 37' is shown at 50 in FIG. 6, with an image 51 corresponding to one wavelength or wavelength range at the left of the frame and an image 52 corresponding to the other wavelength or wavelength range at the right of the frame. In this example the signals in the red channel on the right show less bright signals as the image shows weak fluorescence resonance energy transfer from "green" fluorophores to "red fluorophores. Separation of returned light into different wavelength bands and different areas of a detector enables a mix of techniques to be used simultaneously, such as scattering and fluorescence. The use of emission clean-up filters blockslight at the illumination laser wavelengths from reaching the detection apparatus.

An alternative configuration of the mirrors 39c, 39d, lens 39e and CMOS camera 37' is shown in FIG. 3c, in which the optical paths proceed generally left to right as seen in the Figure, as opposed to the reflection of 180° shown in FIG. 3b. The Figures are intended to illustrate that different optical paths may be selected, depending on the most efficient way of arranging optical paths and components on the primary optical support element 16 to obtain a compact system.

Second Example

Figure 7A:
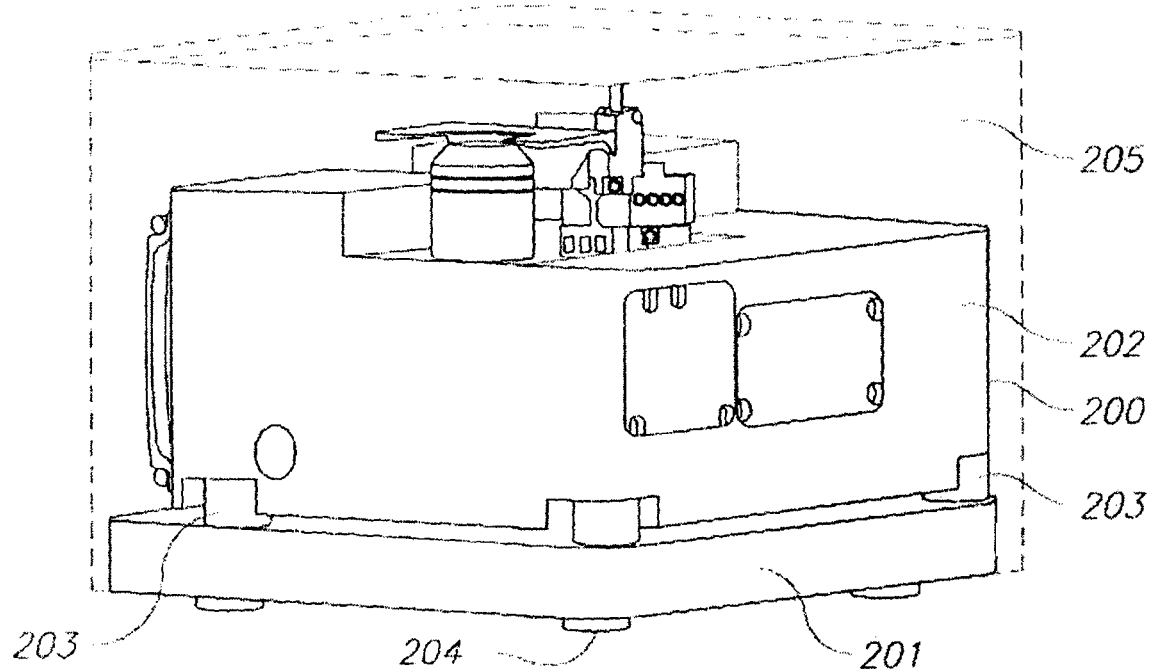
Figure 7B:
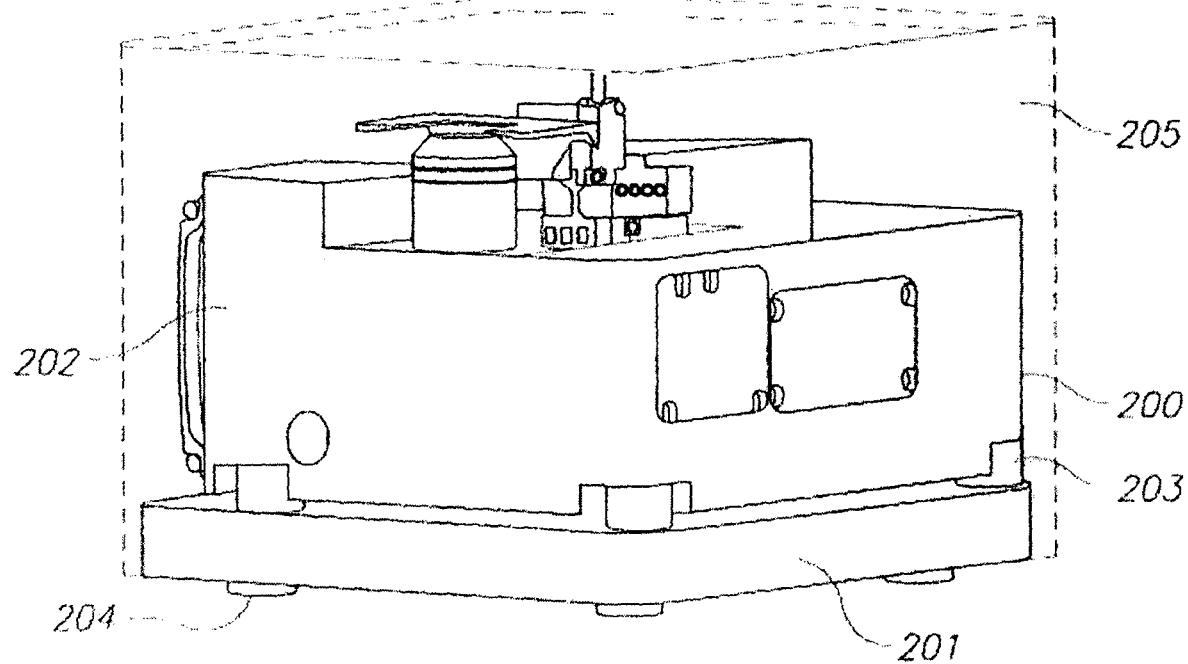
Figure 8A:
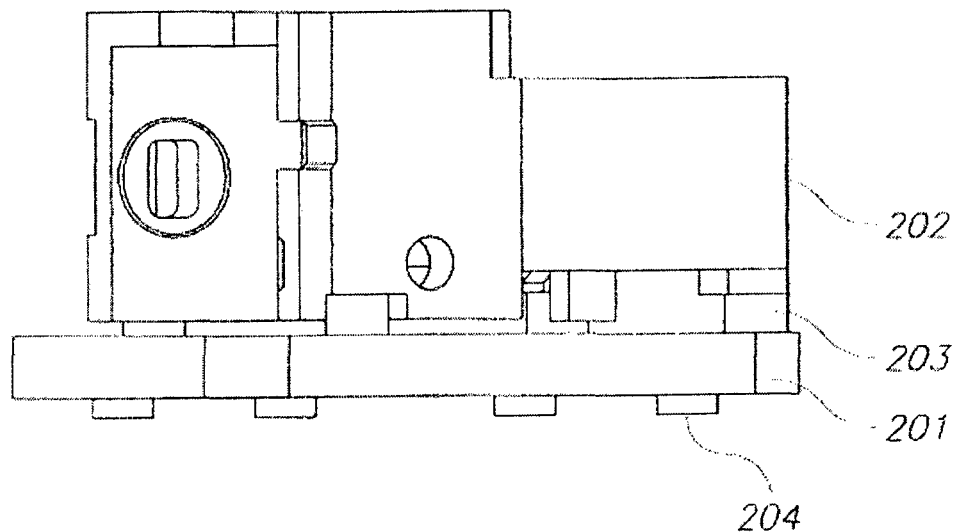
FIGS. 8a to 8d are perspective views of a primary optical support element of the compact microscope of FIGS. 7a and 7b, FIGS. 9a to 9d are diagrammatic views of the configuration of the compact microscope of FIGS. 7a and 7b.
Figure 8B:
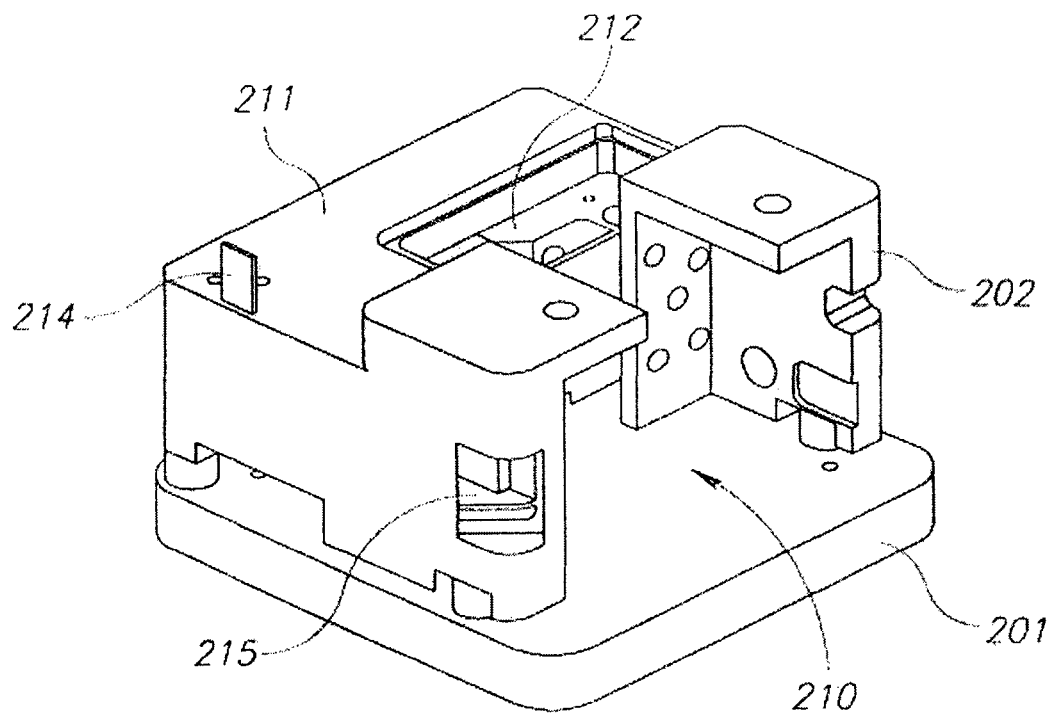
Figure 8C:
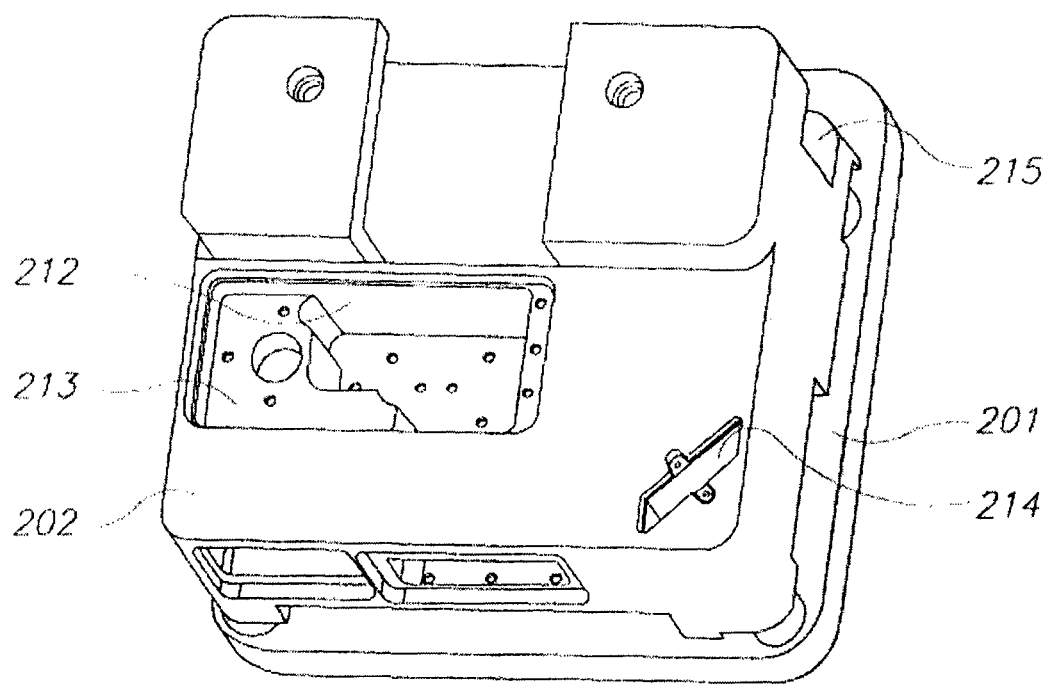
Figure 8D:
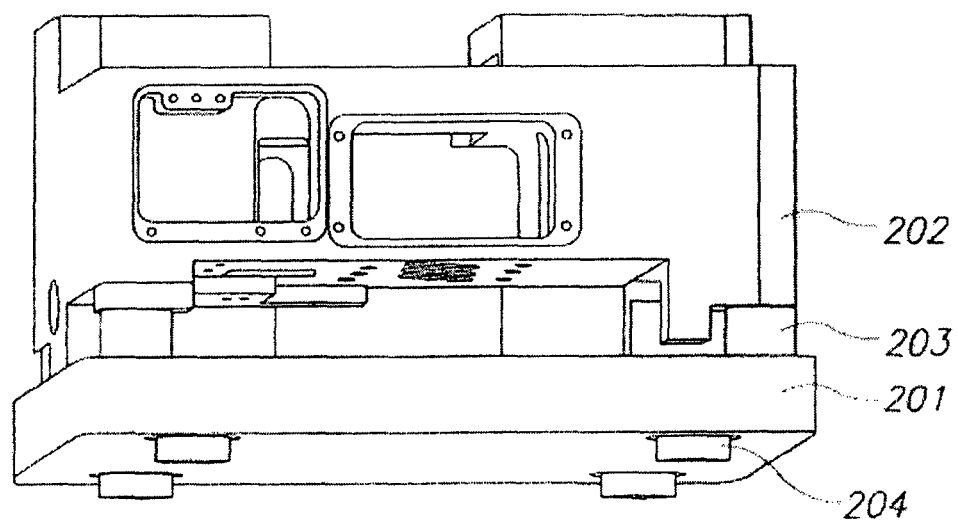

A second embodiment of a compact microscope will now be described with reference to FIGS. 7 to 11b. As shown in FIGS. 7a and 7b, a compact microscope shown at 200 comprises a substantially planar support element 201 which supports primary optical support element 202. The primary optical support element 202 is supported by the support element 201 through vibration isolating mounts 203. In addition, the support element 201 has vibration isolating feet 204 on its slow surface to engage the potentially unstable work surface on which the compact microscope 200 is placed, to further reduce transmitted vibrations.

As shown in FIGS. 7a and 7b, the compact microscope 200 further includes an enclosure 205 which is supported by the support element 201 but is physically distinct from, and not connected to, the primary optical support element 202. The enclosure 204 serves to isolate the optics of the microscope from environmental influences and external light, and to protect the user from harmful light intensities within the microscope. As in the first embodiment, the enclosure 204 may be provided with an interlocked access hatch to provide access to the sample stage if required.

The primary optical support element 202 will now be described in more detail with reference to FIGS. 8a to 8d. In these figures, the primary optical support element 202 is shown located on the support element 201, but with the enclosure 205 and the secondary optical support elements, described below, omitted. In contrast to the embodiment of the compact microscope shown in FIGS. 1 to 6, in this example the primary optical support element 202 is a complex shape designed to accommodate the optical components in a multi-planar configuration, permitting a more compact arrangement than a relatively simple planar primary optical support element. The primary optical support element 202 has two sections, a camera support section generally shown at 210, and an optical support section generally shown at 211. The optical support section 211 comprises a volume 212 to receive the optical components in a number of secondary optical support elements. An upper part 213 of the volume 212 is shaped to receive an objective stage, described in more detail below. The primary optical support element 202 further includes integral mirror mounts to receive mirrors to direct light from the microscope tube lens to the camera as discussed in more detail below. The primary optical support element 202 in this example comprises four machined components which are rigidly attached to one another, but any suitable means of fabrication and assembly may be used. It would be possibly to fabricate the primary optical support element as a single component, but using multiple elements enables modularity (for example to permit the use of a different camera, or manipulate the signal between the tube lens and the camera) and makes machining the components easier.

Figure 9B:
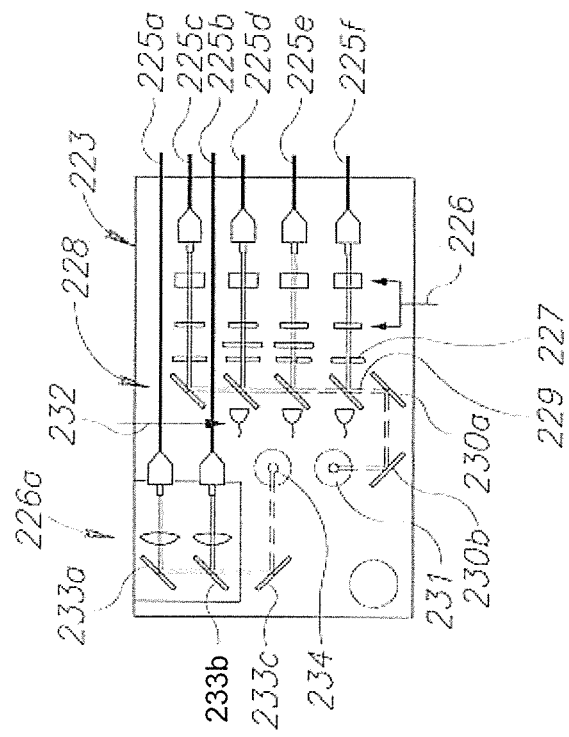
FIG. 9e is a perspective view of the optical configurations of FIGS. 9b to 9d.
Figure 9D:
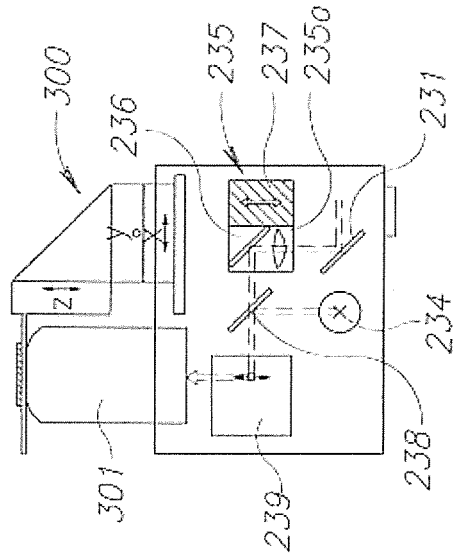
Figure 9A:
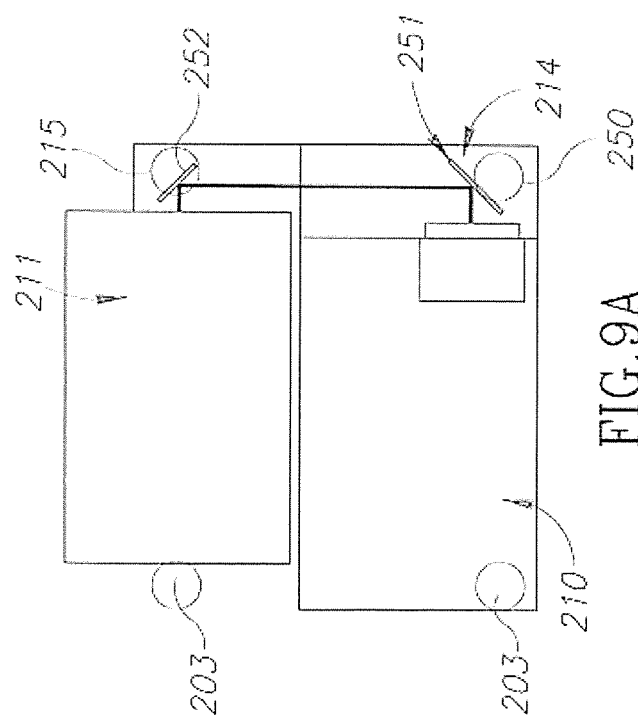

The layout of the compact microscope 200 is shown diagrammatically to scale in FIGS. 9a to 9e. FIG. 9a is a top view showing the relative arrangement and dimensions of the optical arrangement and camera to scale. The locations of the vibration isolating mounts 203 are shown for reference, and in this example the total footprint is about 180 mm on each side. The microscope optics are laid out so that the dimensions of the optical arrangement are 146 mm×90 mm, achieved by stacking multiple layers of optics on top of or next to one another in close proximity.

As seen in FIGS. 9a to 9e, the optics are arranged in three planes, a lower plane 220, an upper plane 221 and a vertical plane 222. Broadly, the illumination optical system is located in the lower plane 220 and the vertical plane 222, and the receiving optical system is located in upper plane 221. As seen in FIG. 9b, the lower plane 220 comprises a light receiving section 223, to receive light from a plurality of optical fibres from a suitable source, for example an illumination source module similar to that of FIG. 3a. The optical fibres are shown at 225a to 225f. The light received from fibres 225c to 225f passes through a respective pair of cylindrical lenses 226 and an aperture 227 similar to be aperture 27 of FIG. 2a. As in the example of FIG. 2a, to provide a beam having a desired profile, in this example a substantially rectangular beam shape, without requiring complex and optics and thus reducing the space required. A series of dichroic mirrors 228 reflects the beams along a common path, 229 such that the combined beams strike mirrors 230a, 230b and are directed towards first upwardly reflecting mirror 231 lying in plane 222 which reflects the combined beams upwards.

A plurality of photodiodes 232 are located to receive light which passes through the dichroic mirrors 228, to enable the respective power in each beam arriving at the microscope to be measured. Advantageously, no additional beam splitter is required to allow the determination of the power in each beam, maximising the available usable power and reducing the need for further components.

The light from fibres 225a, 225b is received separately from that fibres 225c to 225f. The received light is directed through focusing lenses 226a and directed by mirrors 233a, 233b, 233c to second upwardly reflecting mirror 234 in the vertical plane 222. Mirror 233b may be a dichroic mirror.

Figure 9C:
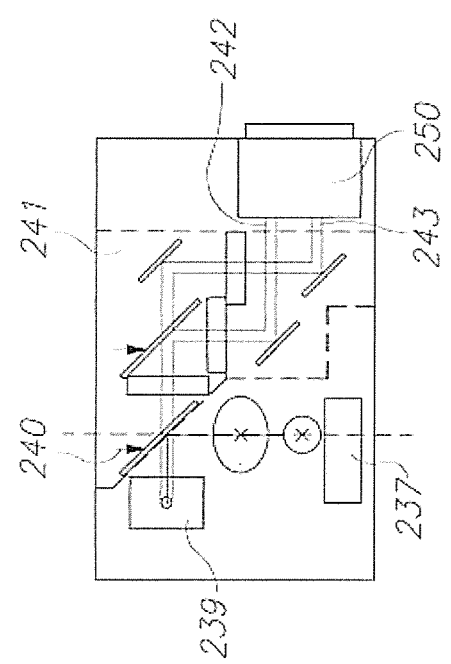
Figure 9E:
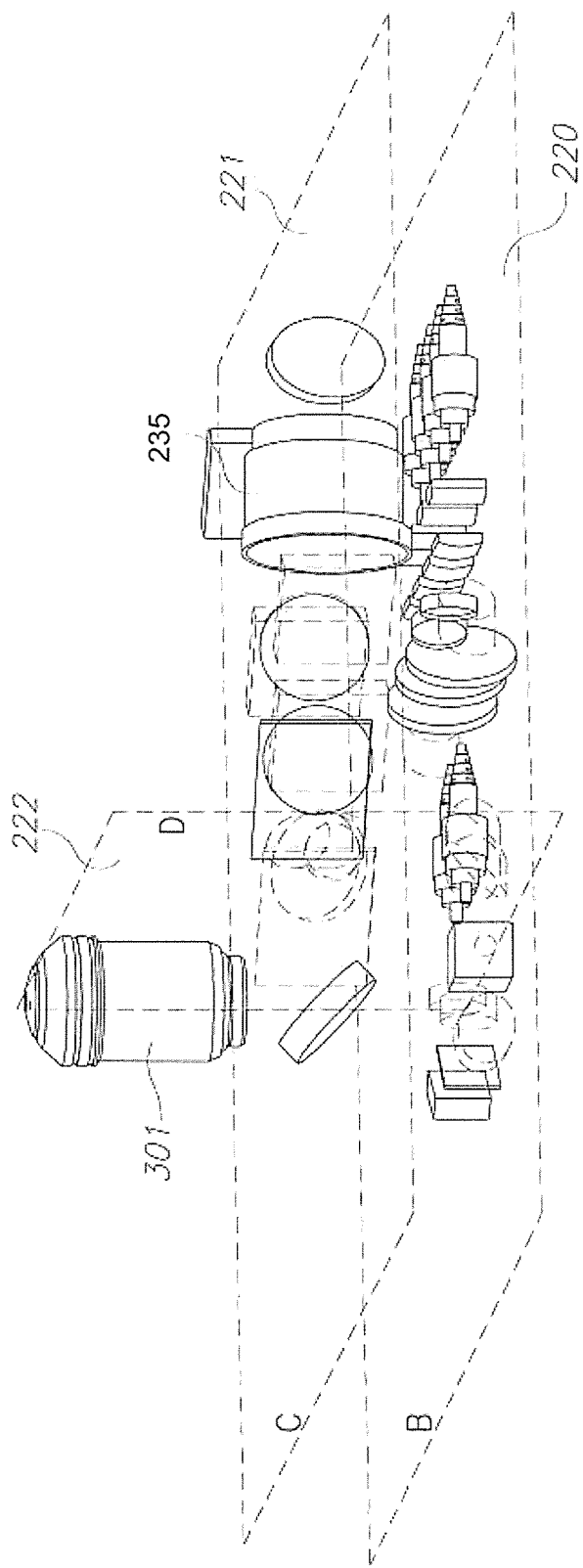

The optics in the vertical plane 222 are shown in FIGS. 9d and 9e. The light reflected from first upwardly reflecting mirror 231 is received by a wide field lens unit 235. The light is focused by the widefield lens 235a and is directed laterally by mirror 236 towards dichroic mirror 240 and then mirror 239 which reflects the converging beam into the objective, such that a focus is formed in the rear focal plane of the objective, and collimated light emerges out of the objective front focal plane. The wide field lens unit 235 includes a piezo actuator 237 which may be automatically or manually controlled to vary the position of lens 235a. The piezo actuator 237 translates the lens 235a and the mirror 236 so that the distance from the lens 235a to the objective remains constant. This is in particular required for a short focal length lens 235a, but a constant distance to the objective is not crucial for larger microscopes where a lens with much longer focal length is used. The piezo actuator allows the lens 235a to adjust the illumination for total internal reflection microscopy. Light from second upwardly reflecting mirror 234 strikes a fused silica window 238 and is simply directed to mirror 239 and into the objective stage 300. There are minimal losses for the light directed from the first upwardly reflecting mirror 231 because the fused silica window 238 is transparent in the relevant wavelength region and is anti-reflection coated. The use of fused silica minimizes fluorescence generated by the light transmitted through the window from mirror 231.

In this example, minimal transmission losses are needed for the converging light from upwardly reflecting mirror 231 which illuminates a large (for example 120 µm×60 µm) area in the sample plane, requiring more power, and high reflection losses are acceptable for the collimated light from upwardly reflecting mirror 234 which illuminates a small (for example 1 µm×1 µm) area, requiring less power. For other applications, other components such as dichroic mirrors may be used in place of the fused silica window.

The light returned from the sample and objective lens 301 is then directed by mirror 239 and dichroic mirror 240 to the receiving optical system generally shown in FIG. 9c. The receiving optical section includes modular elements in the area 241 which may be removed or adapted depending on the technique or function to be used with the microscope. In this example, module 241 comprises an optical arrangement similar to that of FIG. 3c, in which returned light from a sample in two wavelength ranges is separated into two spatially offset beams 242, 243 and directed to tube lens 250. The output beams are directed by mirror 251, held in integral mount 214 and mirror 252, held in integral mount 215, to the camera. The offset beams result in an output image shown as FIG. 6, with images 51 and 52 corresponding to different wavelengths or wavelength ranges offset two separate sections of the image frame.

Again, it will be apparent that the geometry of FIGS. 9b to 9e is extremely adaptable, in that only a subset of the input fibres 225a to 225f need be used as required, and the return optical module 241 may be replaced as required. The requirement is only that the beams entering and leaving the module 241 are focused to infinity to enable easy replacement.

Figure 10A:
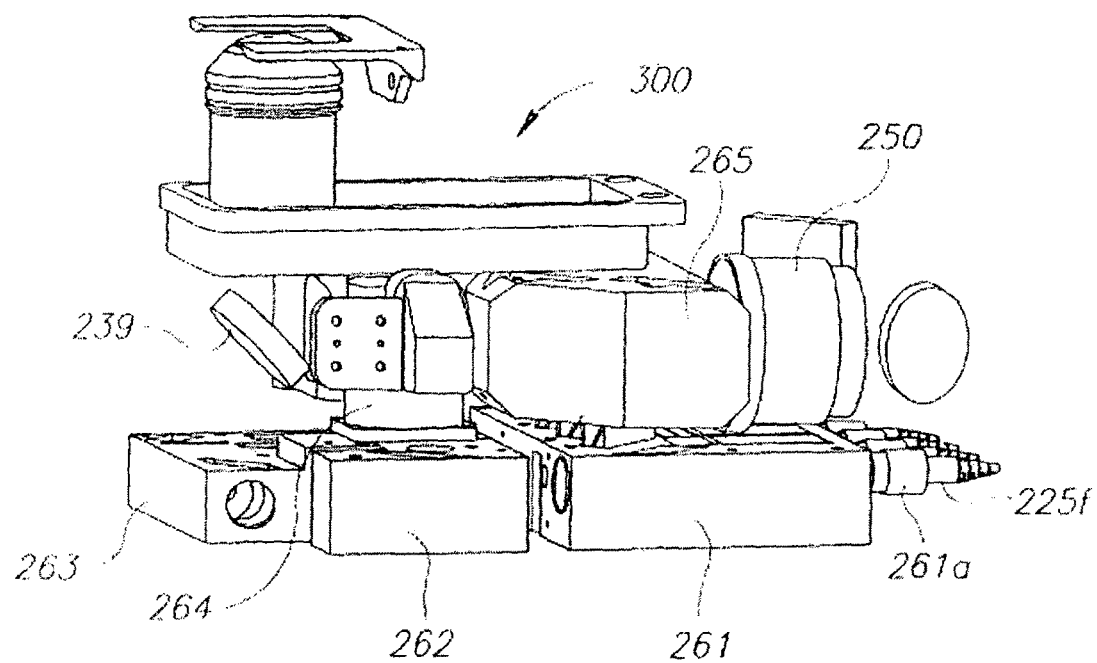
FIG. 10a is a perspective view of the secondary optical support elements of the compact microscope of FIGS. 7a and 7b.
Figure 10B:
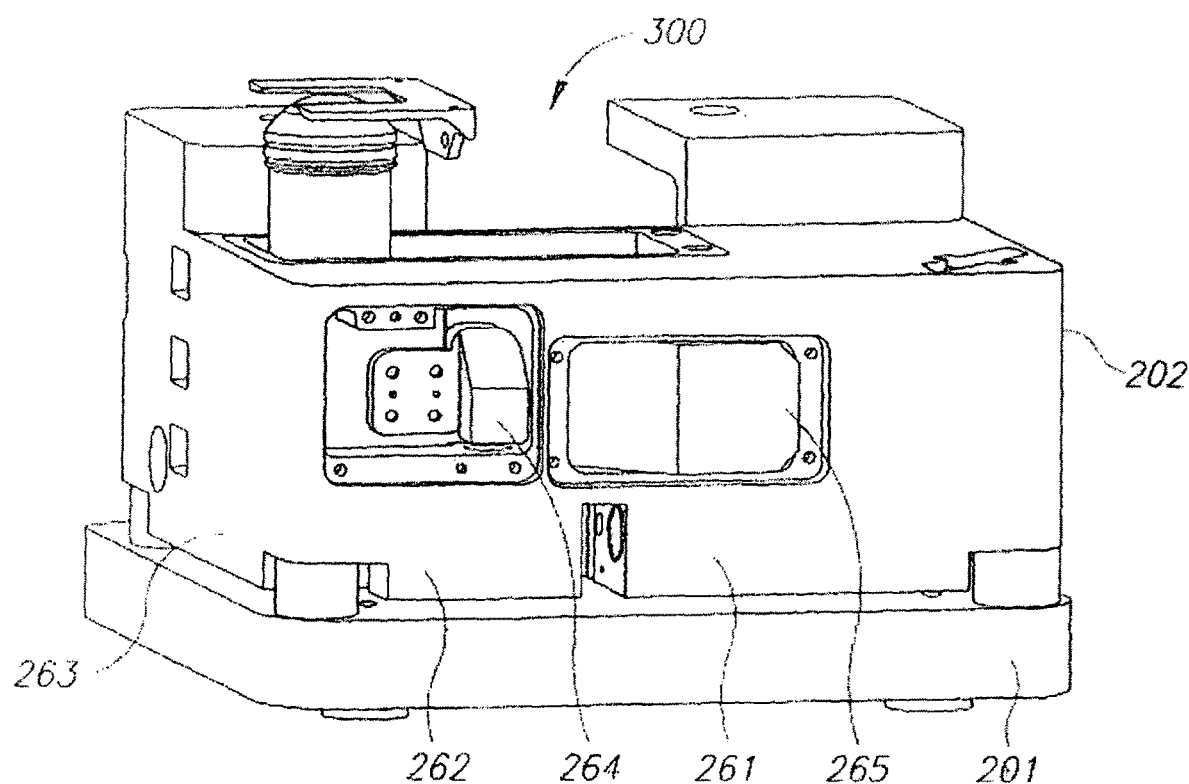
FIG. 10b is a perspective view of the secondary optical support elements of the compact microscope of FIGS. 7a and 7b mounted in the primary optical support element of FIGS. 8a to 8d.

The secondary optical support elements are illustrated in FIGS. 10a and 10b. First secondary optical support element 261 has connections 261a to receive fibres 225c to 225f and includes lenses 226, apertures 227 and mirrors 228 and 230a. Second secondary optical support element 262 supports first and second upwardly reflecting mirrors 231, 234. Third secondary optical support element 263 similarly contains simply comprises connectors (not shown) to receive fibres 225a, 225b, lenses 232 and mirrors 233a, 233b, 233c. Fourth secondary optical support element 264 holds the wide field lens unit 235 including the wide field lens 235a, piezo actuator 237 and mirror 236. Silica window 238 is held in place by a separate secondary optical support element and mirror 239 is held directly by the primary optical support element 202. Fifth secondary optical support element 265 provides the receiving optical system 241 as a unit or a as a group of sub-modules. As illustrated in FIG. 10b, each of these components is received within volume 212 of the primary optical support element 202, substantially filling the volume 212 thus providing a rigid and accurately aligned configuration which is modular and adaptable as required. If necessary, parts of the volume 212 not otherwise occupied by secondary optical support modules may be occupied with solid or hollow filler blocks to provide additional rigidity. At the same time, since many apertures are required to allow the beams to propagate, the microscope is filled with holes, making it a naturally rigid, light-weight, hollow structure, which reduces deformation by self-weight. Advantageously the different planes are separated by an opaque part of the primary optical support element or a secondary optical support element.

Figure 11B:
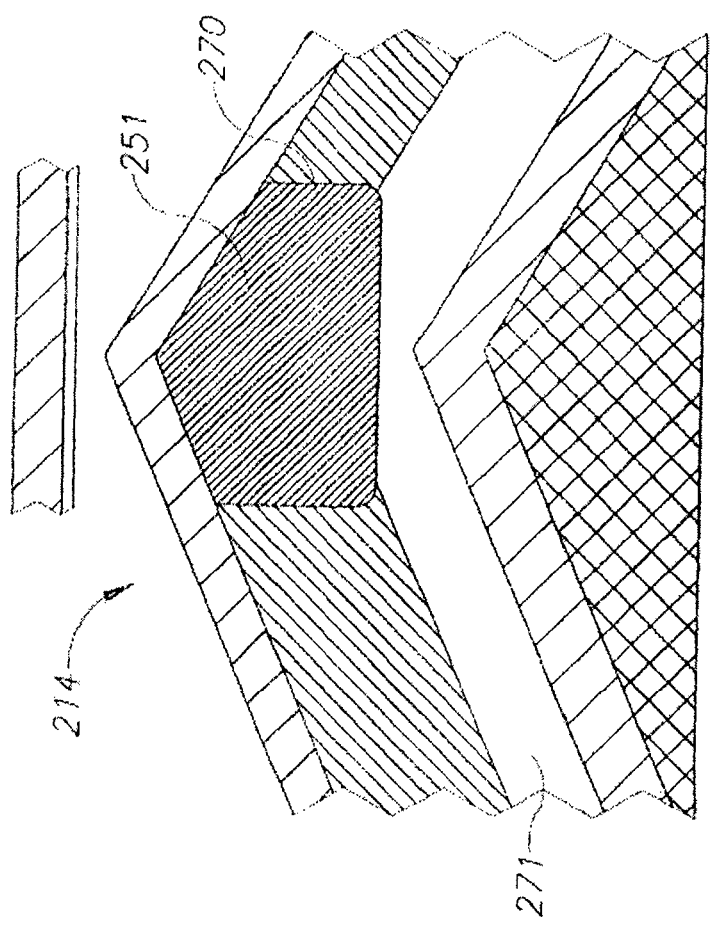
FIG. 11b is a sectional view of a further integral mirror mount of the compact microscope of FIGS. 7a and 7b.
Figure 11A:
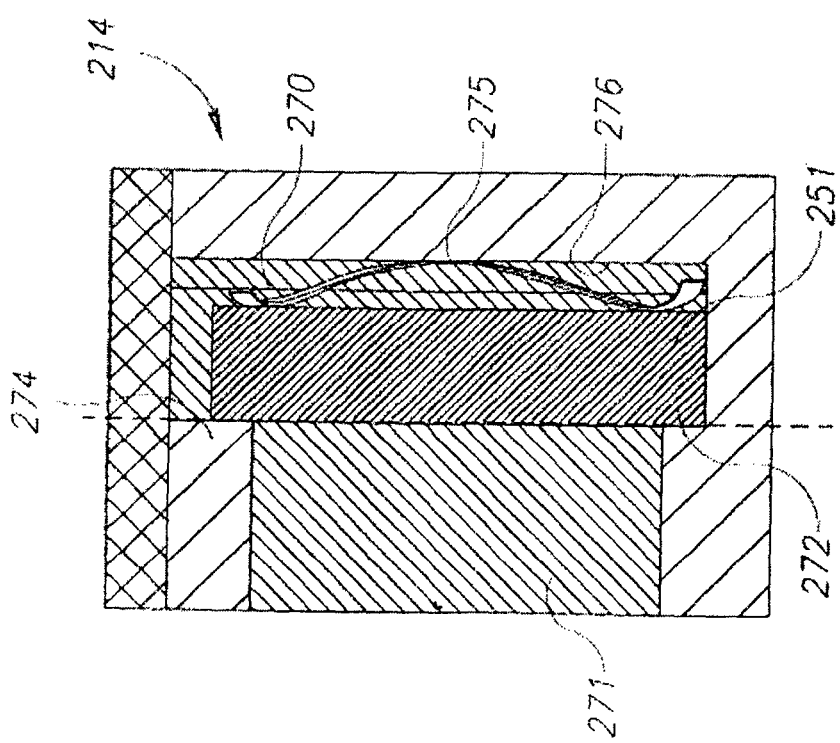
FIG. 11a is a sectional view of an integral mirror mount of the compact microscope of FIGS. 7a and 7b.
Figure 12:
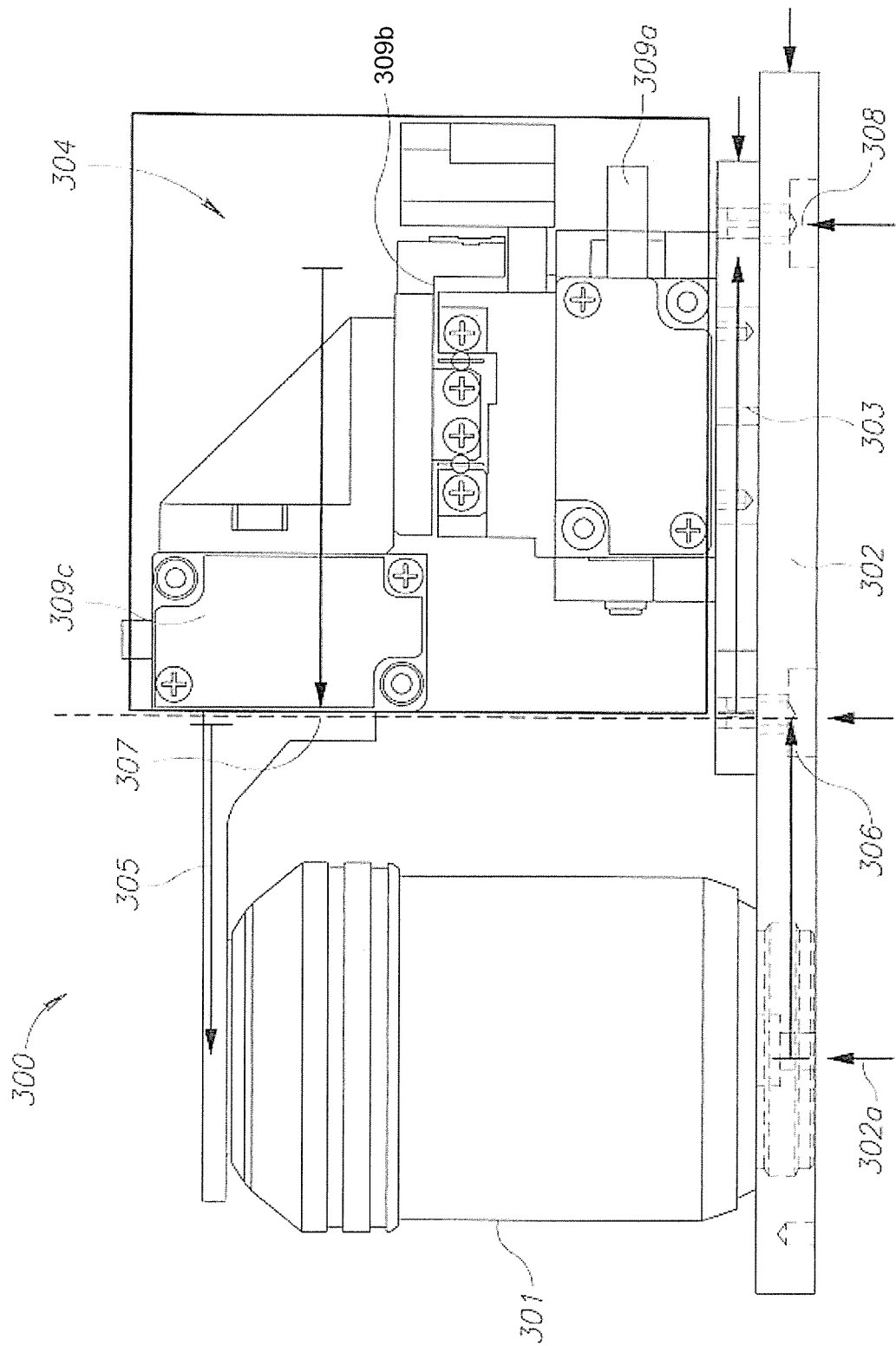
FIG. 12 is aside view of an objective stage for use with a compact microscope embodying the present invention.

An integral mirror mount 214 is shown in more detail in FIGS. 11a and 11b. As seen in FIG. 11a, integral mirror mount 214 comprises a vertically extending slot 270. A beam aperture is shown at 271, comprising a right-angled channel. The vertical slot 270 is shaped such that it has a depth greater than the depth of the beam aperture 271 to provide a lower support step 272. The mirror 251 is sized such that it engages the lower support step 272, extends across with the beam aperture 271 and engages an upper lip 274 of the slot 270 above the beam aperture 271. A spring 275 located between the mirror 251 and a back wall 276 of the slot 270 holds the mirror in place. The spring exerts a constant, temperature insensitive force perpendicular to a surface to which the optical element aligns to. A similar configuration is used for integral mount 215, with the exception that the slot 270 is shaped such the mirror 252 is introduced perpendicular to the alignment surface rather than in parallel, and is held in place by a suitable locking element that compresses the spring. Hence, each integral mirror mount 214, 215 has a surface against which a respective mirror is held, which is permanently defined by the machining process and cannot be altered, making misalignment impossible. In addition to defining the alignment surface, the machining process concurrently creates an access port such that the mirror and the spring can be inserted. Isolation against dust is also provided since the mirror makes physical contact with the alignment surface and seals the machined apertures in which the light propagates. Although only integral mirror mounts 214, 215 are shown in the figures, similar integral mirror mounts are used elsewhere in the primary and secondary optical support elements where appropriate Objective Stage The objective stage 300 is shown in more detail in FIG. 12. The objective stage 300 supports the microscope objective 301. The objective stage 300 comprises an Invar baseplate 302 on which is mounted a movement stage 304, primarily made of aluminium, for example. The movement stage 304 supports and moves an Invar sample holder 305 and allows the adjustment of the three-dimensional position of the sample holder 305 relative to the microscope objective 301. The stage 304 is connected to Invar baseplate 302 by a plate 303 of the same material as the stage. A first mounting point 306 connects the aluminium plate 303 and the Invar baseplate 302 such that mounting point 306 is aligned with the front face 307 of the stage 304. A second, rearward, mounting point 308 connecting the aluminium plate 303 and the Invar baseplate 302 allows for relative sliding movement between the aluminium plate 303 the Invar baseplate 302. The Invar plate is mounted on the primary optical support structure in recess 213 and fixed to the primary optical support structure 202 through a first fixed mounting point 302a which is aligned with the axis of the objective, and a second mounting point (not shown) that allows relative sliding movement between the aluminium primary optical support structure 202 and the Invar plate 302. The movement stage 304 has three piezo friction motors, generally shown at 309a, 309b and 309c respectively.

The objective 301 is thus held in a fixed position relative to the primary optical support structure 202 and the optical systems mounted therein. The configuration of the objective stage 300 allows for compensation of thermal expansion of the movement stage 304, expansion of the sample holder, and of the material connecting the objective and the movement stage 304.

The compensation for the thermal expansion of the movement stage 304 is achieved by locating the fixed mounting 306 of the aluminium plate 303 underneath the aluminium stage aligned with the face 307 of the movement stage 304, which is contact with the Invar sample holder 305. Therefore, if the aluminium movement stage 304 expands to the left, the aluminium plate 303 will expand to the right and the amount of expansion relative to the face 307 is equal and will therefore cancel. The compensation will not completely cancel the relative expansions when the stage 304 is moved from the centred position toward or away from the objective and the face 307 misaligns with fixed mounting point 306. However, this geometry will reduce drift to a minimum, and drift increases linearly from 0 when the stage 304 is at the default position to a small maximum at the extremes of the stage range (which will be used less likely than a position close to the centered position).

In this geometry, thermal expansion of the Invar section between the objective lens 301 and face 307 is equal in magnitude but opposite to the thermal expansion of the sample holder 305, so that relative movement between the objective 301 and a sample held on the sample holder 305 is cancelled. The fixed mounting 302a ensures that the objective 301 remains in place while the sliding mounting allows the Invar base plate to expand or contract relative to the primary optical support element 202.

Although the objective stage 300 here comprises Invar and aluminium components, it will be apparent that the stage may comprise components fabricated from other materials as desired. Two pairs of parts should have matched thermal expansion coefficient, the first pair being the sample holder and the objective mounting plate, and the second pair being the movement stage and the plate 303. The objective stage may be used with any other suitable microscope, not only the examples described herein, and may comprise one actuator or any number of actuators as needed for the desired degrees of freedom of movement of the sample holder.

Focus Control

A focus control system can maintain the axial position of the sample relative to the focus of the objective lens 301 by controlling the position of the sample holder 305.

To achieve this, a focus stability beam is provided from a focus stability beam fibre connection. In the first embodiment of the compact microscope, a microscope focus control system is illustrated in FIGS. 2, 3a and 4. A focus stability beam 60 is provided from a focus stability beam fibre connection 61, connected to in this case a single-mode optical fibre 61a to transmit light from a focus stability beam laser source 59 in the illumination source module 40. Focus stability beam 60 is collimated by lens 62 and directed to the objective lens system by mirror 63 and dichroic mirror 34. The mirrors 63, 34 direct the focus stability beam 60 into the objective lens system 18, in this example at an angle relative to the optical axis 25. The focus stability beam fibre connection 61, lens 62, mirror 63 and dichroic mirror 34 are collectively referred to as the focus stability beam optical system.

In the second embodiment of the compact microscope, one of the fibres 225a, 225b may be used as the focus stability beam fibre connection. In this case, the focus stability beam is directed to the objective lens 301 by mirrors 233a, 233b, 233c and 234 as discussed above.

The wavelength of the focus stability beam can be chosen such that the sample is not affected by the light (e.g. off-resonance light if the sample contains fluorescent molecules). The focus stability beam is preferably only active when the sample is not being imaged. The objective lens system focuses the focus stability beam at the interface between cover glass and sample medium, where a part of the light is reflected. The beam enters the objective on the same path as the excitation lasers, but it is collimated so that an approximately focused spot is visible in the image plane (on the camera) when the glass/sample medium interface is at the front focal plane of the objective. The beam is strongly converging due to the high numerical aperture of the objective lens, so that any movement of the interface away from the focal plane causes the reflection image to widen significantly. Ideally the input focus stability beam should fill the objective back aperture to a sufficient degree, otherwise the numerical aperture of the objective will not be fully used. Light scattered from the illuminated region will be returned by the return light optical system to the detection apparatus, where an image can be captured. The image of the reflection will have a size, shape and position that depend on the distance between objective and the interface. To control the focus, the system and method compare a reference image with a subsequent image.

A first way of operating the focus stability system is in a focus lock mode. After the sample has been initially correctly positioned, the focus stability beam can be transmitted to the objective lens system and a reference image saved. If the position of the sample shifts relative to the objective, in a subsequently captured image the illumination region will change appearance. Accordingly, after moving to another field of view, a subsequent image is captured. If this differs from the reference image, the z-axis positioner is iteratively operated. The z-axis position will be varied in accordance with a calculated difference between the reference and subsequent images, and a further subsequent image captured. Again, the difference is calculated and a further z-positioning step carried out. In this way, the system will converge on the original focus in a few steps. A constant position offset may be set so that the z-positioner moves by this offset after the focusing routine has finished. This allows focusing to arbitrary z positions using a single set of references images. These reference images they may be taken around the region where the focus beam signal is strongest. The difference between the images may be calculated in any suitable manner.

In a second way of operating the focus stability system, storing a reference image may include storing a stack of reference images each corresponding to a known different relative z-position above the glass/sample medium interface. This may be used to move the sample to a desired z position or to determine the z position of the sample. When it is desired to move the sample to desired z position, the reference image corresponding to that z position can be retrieved and an iterative process similar to that described above carried out, taking subsequent images and moving the z-axis positioner in small steps until the subsequent images converge on the desired reference image. Alternatively, by capturing a subsequent image and determining which reference image is the best match for the subsequent image, the z position of the sample can be determined. If the subsequent image matches a set of reference images to a similar degree, an interpolation algorithm may be used to determine a subsampled z-position. Once the relative z-position above the interface is known, a controlled movement of the z-positioner to the desired z-position may be performed.

A reference image or stack of images may be stored when the device is manufactured or calibrated. Additional or replacement reference images may be captured at any suitable point during operation of the microscope, for example before starting an acquisition, if a new focal plane is required or if the reference image becomes incompatible with the correct focus due to changes in the sample, or the microscope system. A subsequent image may serve as a reference image for subsequent operation.

Figure 13:
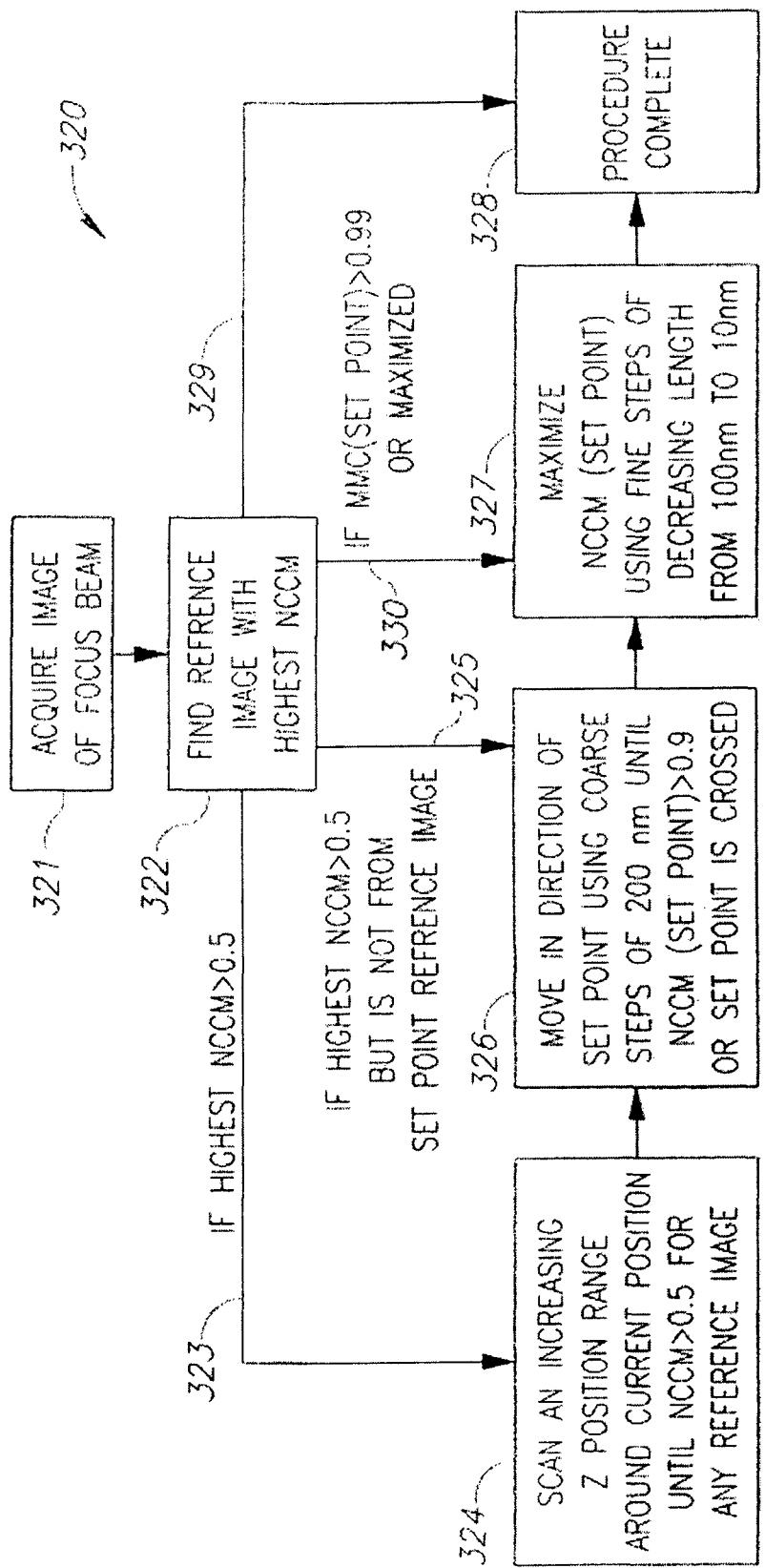
FIG. 13 is a diagram illustrating operation of a focus control system.

An example method is illustrated at 320 in FIG. 13. As shown at step 321, an image of the focus beam is acquired. At step 322 to the reference image with the highest normalised cross-correlation maximum (NCCM) is identified. The NCCM is a measure of how similar the captured and reference images are to each other, with complete similarity giving a score of 1 and no similarity giving a score of $\bullet$. Such an algorithm is sensitive to the structure of the reflection pattern, but not its intensity by its position on the camera.

Figure 14:
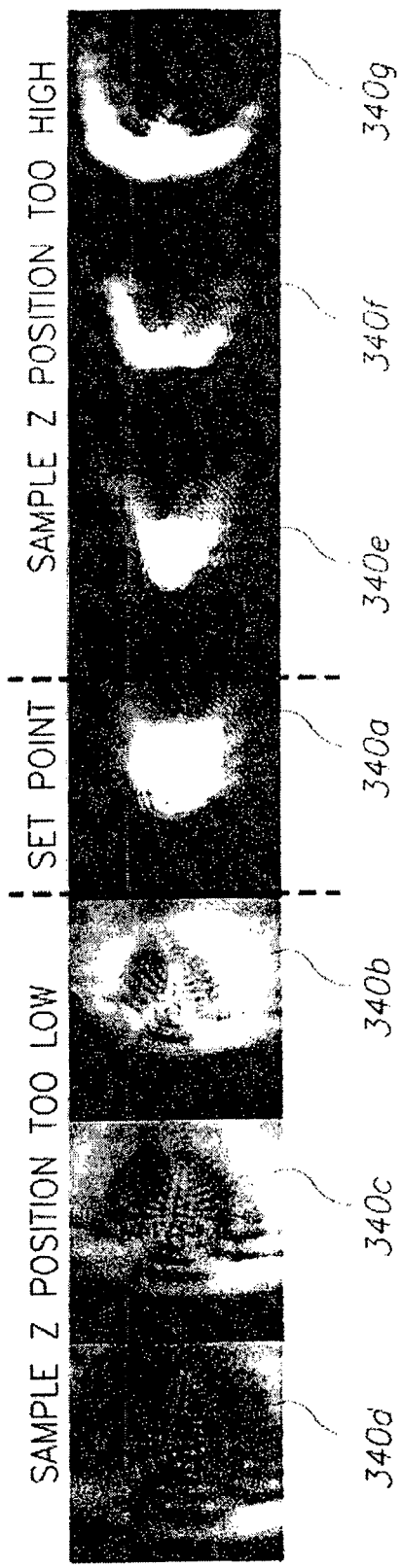
FIG. 14 shows a plurality of example reference images for use with the focus control system of FIG. 13, FIGS. 15a-15c show examples of detection paths for one- to three-colour wide-field fluorescence microscopy.

As shown by arrow 323, if the highest NCCM is less than 0.5, then at step 324 the sample stage 305 is moved around the current z position at increasing ranges, and repeated images captured, until an image with a cross-correlation measure of >0.5 for any reference image is found. Once the step is complete, the method moves to step 326, which alternatively may be moved to directly from step 322 as shown by arrow 325 if the highest NCCM is >0.5 but is not from the set point a reference image. At step 326 the stage is moved in the direction of the set point using relatively large steps of 200 nm until the cross-correlation measure is >0.9 or the set point is crossed. At a fine tuning stage 327, after completing step 326 or directly after step 322 if the highest NCCM is between 0.5 and 0.99 and belongs to the set point reference image (shown by arrow 330), the NCCM is maximised using steps of decreasing length 100 mm to 10 nm. When the NCCM is maximised, the procedure is complete as shown in 328. If the NCCM of the acquired and reference images is initially greater than 0.99, as shown by arrow 329, then the autofocus procedure is ended immediately. A set of example reference images is shown in FIG. 14, where the central figure 340a represents the set point. A series of figures 340b to 340d represent images from progressively lower sample positions. Similarly, reference images 340e to 340g are images resulting from the sample position said being too high. Accordingly, as illustrated in FIG. 13, the focus apparatus will find the image that best matches the acquired image of the focus beam, and then adjust the z position towards the set point, i.e. the process will be iterated until the acquired image of the focus beam effectively corresponds to the reference set point image 340a. Where the acquired image of the focus beam at step 321 is not sufficiently similar to any of the captured images 340a to 340g, this indicates that the sample position is outside the range of the captured images, and the process successively moves the sample position until an image of the focus beam is acquired which is sufficiently similar to one of the stored reference images as shown at 323 and 324.

The microscope focus control system can thus maintain a stable sample position throughout extended operation of the microscope 10. The focusing takes less than 1 second and achieves nanometre accuracy. This auto-focus method does not require an additional photodetector for the reference beam, and lasers of very low beam quality, power and power stability can be used. The power of the focus stability beam in this example is extremely low due to inefficient single-mode fibre coupling without a focusing lens to the fibre 61a and as such presents a minimal hazard. The absence of a fibre coupling lens also removes the need for (re-)alignment of the laser with respect to the single-mode fibre. A focusing lens for fibre coupling may be used if coupling efficiency is too low to produce an image with sufficient signal to noise.

In experiments where the sample is immobilized on the glass substrate, it is often possible and desirable to record independent data sets by moving the field of view to a new area which has not been exposed by the excitation lasers. Due to thickness variations of the cover glass on the order of a few microns and motion irregularities of the sample stage, a refocussing step is usually necessary before the acquisition of a new field of view. The focus control system allows this movement and refocussing step to be carried out automatically. For example, the sample could be moved in a spiral pattern to record multiple fields of view. Before each field of view is exposed by the excitation lasers, the focus control brings the sample to a pre-defined axial position. As the light for the focus stability beam is emitted from the end of a fibre attached securely on the principle optical support element of the microscope, and the collimating lens and beam steering mirrors for the focus stability beam lack any degrees of freedom for adjustment, the angular stability of the beam is improved. Instead of using a dedicated sensor, the use of the main camera to detect the image of the focus stability beam again reduces the number of required components.

As a further method of controlling the focus and allowing movement to a user desired plane, the glass/sample medium interface is set as the set point and the user is not permitted to change it. The focus control mechanism then moves the interface to the focal plane, and the position sensor of the piezo stage (which has ~1 nm precision) is then used to navigate away from the interface to a desired position. In other words, the interface is used as a starting point for movement relative to it, which could eliminate the need for recording reference images by the user and establishes the interface as the origin plane of a well-defined coordinate system.

It will be apparent that the microscope focus control system will be suitable for use for any other type of microscope, not only the embodiments of compact microscopes described above. If appropriate, the focus control system may have its own imaging apparatus separate from the main detector of the microscope.

Alternative Optical Configurations

Examples of how the microscope may be adapted to other applications are illustrated in FIGS. 15a to 19b. Advantageously, the compact microscope 200 is adaptable to any of each of these configurations by providing an appropriate fifth secondary support module 265.

Figure 15A:
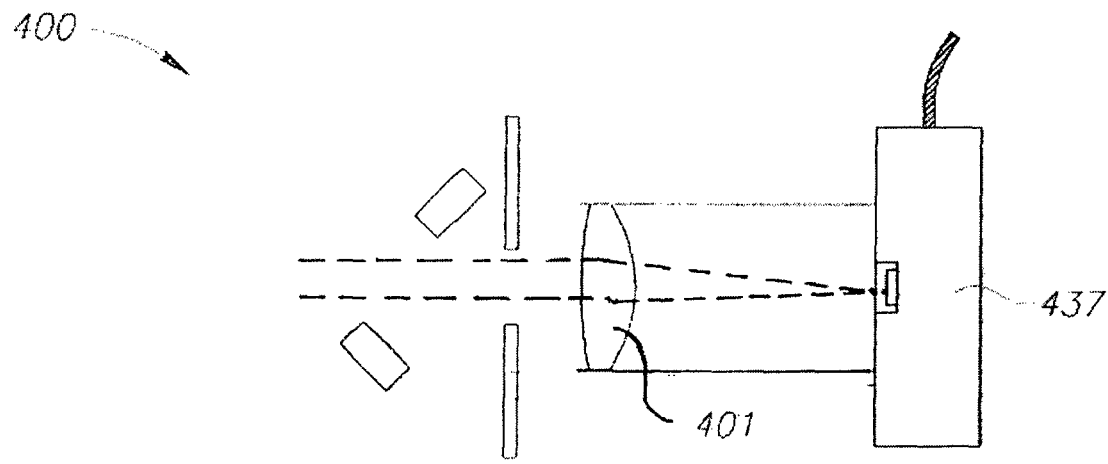
Figure 15B:
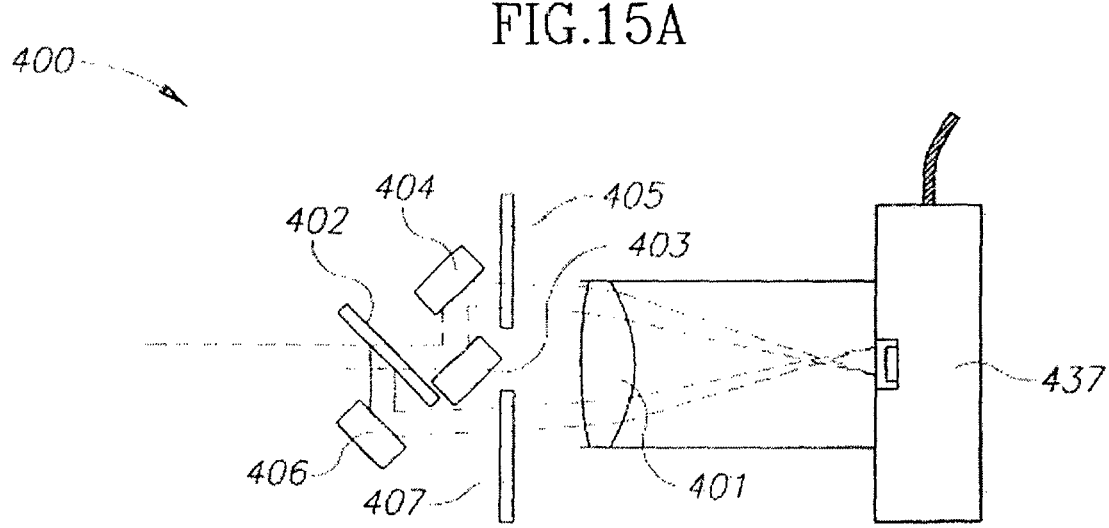
Figure 15C:
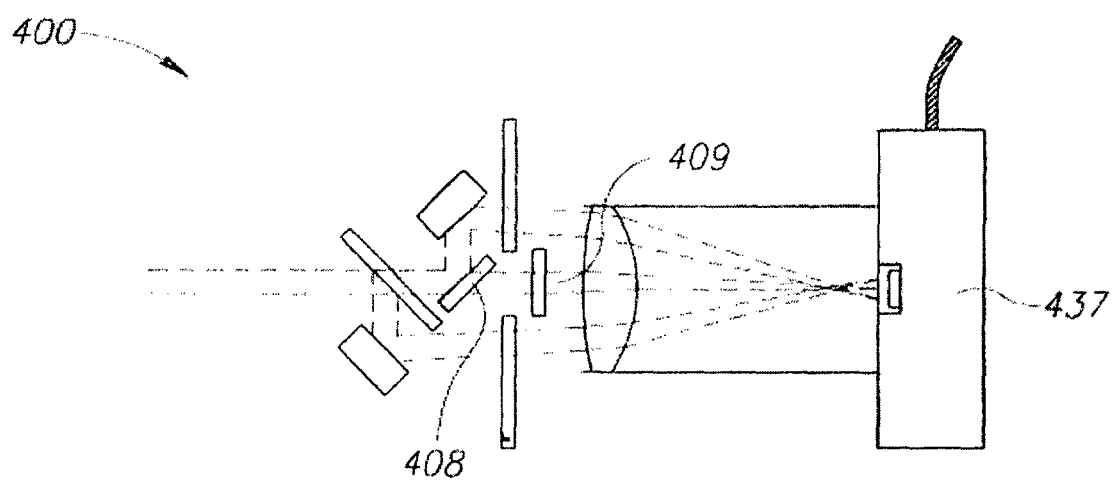

FIGS. 15a to 15c show a configuration of the return optical system adaptable to single-, dual- or three-colour wide-field fluorescence microscopy. The general apparatus is shown at 400 in FIG. 15a, in which the beam is focused by lens 401 directly on camera 437. In FIG. 15b, which is equivalent to the optical paths of FIGS. 3b and 3c, dichroic mirror 402 separates the returned light into first and second wavelength bands. Light in a first wavelength band passes through dichroic mirror 402 and is reflected by mirrors 403 and 404 through a first band-pass filter 405. Light in the second wavelength range is reflected by dichroic mirror 402 and mirror 406 and passes through band pass filter 407. The two resulting beams are spatially offset and are focused on different areas of the camera 437. In a further variation, shown in FIG. 15c, mirror 403 is replaced with a further dichroic mirror 408. Light in a third wavelength range passes through dichroic mirrors 402, 408 and long pass filter 409, and the three resulting beams are focused on separate offset areas of the camera 437.

Figure 16:
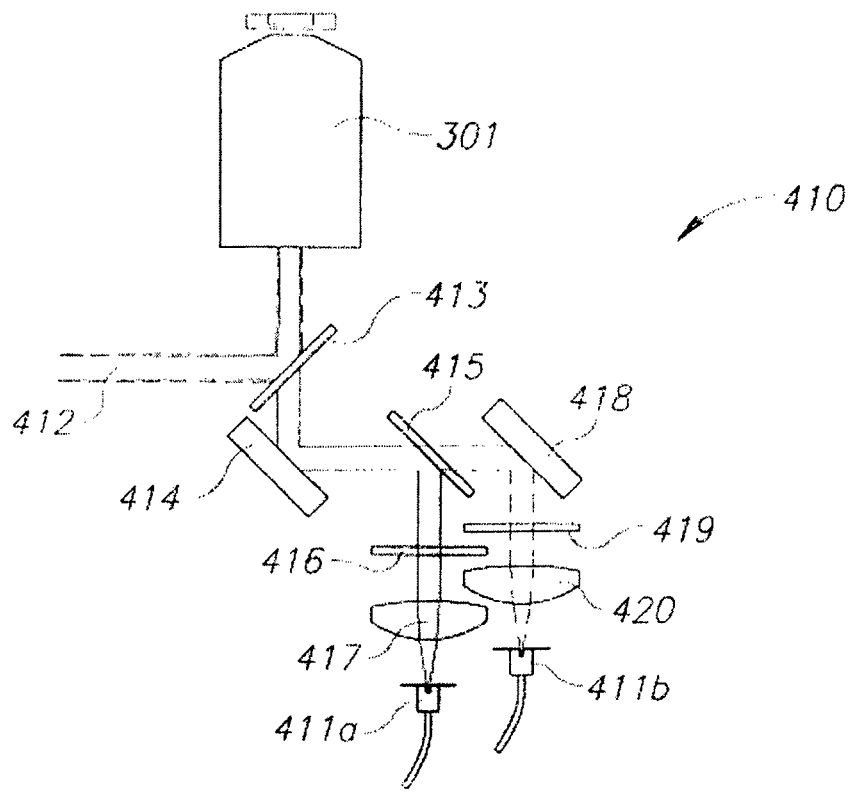
FIG. 16 is an example of optical paths for dual-colour confocal fluorescence microscopy.

FIG. 16 illustrates use of the microscope for dual-colour fluorescence confocal microscopy, and an example optical path is shown at 410. The detection apparatus in this application comprises a pair of photodetectors 411a, 411b, and particularly avalanche photodiodes providing high detection sensitivity. The excitation beam 412 comprises light in two wavelength bands as discussed above, and is collimated. The objective lens system focuses the illumination light on the sample 21. Returned fluorescent light passes through dichroic mirror 413 and is directed to the detection apparatus by mirror 414. Light in a first wavelength band is reflected by long-pass dichroic mirror 415, passes through band-pass filter 416 and is focused by lens 417 on the first photodetector 411a. Light in a second wavelength band passes through dichroic mirror 415 and is reflected by mirror 418, passes through long pass filter 419 and is focused by lens 420 on second photodetector 411b.

Figure 17:
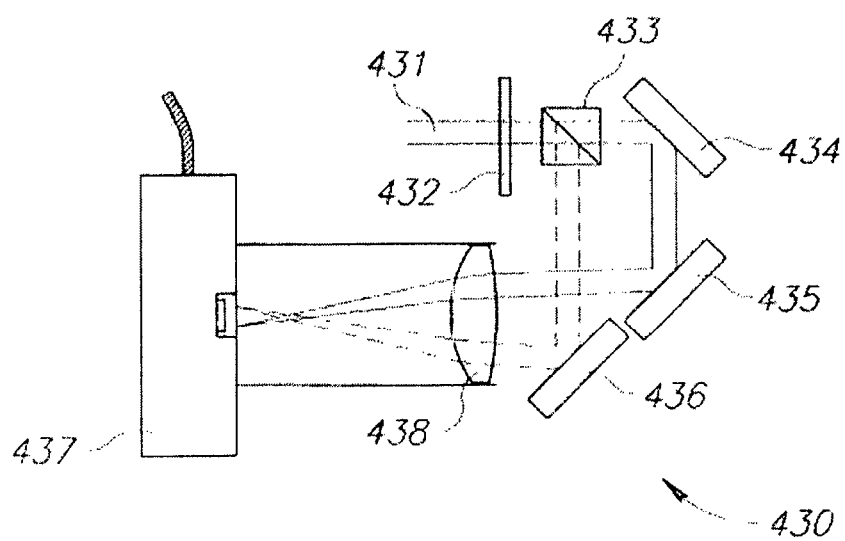
FIG. 17 is an example of an optical path for fluorescence polarization microscopy.

FIG. 17 shows a return optical path for fluorescence polarization microscopy at 430. The returned fluorescent light 431 passes through emission filter 432, and the returned light is separated into different polarization components by polarizing beam splitter 433. Mirrors 434, 435, 436 direct the differently polarized beams through lens 438, and the different beam are focused on offset regions of the imaging apparatus 437'.

Figure 18:
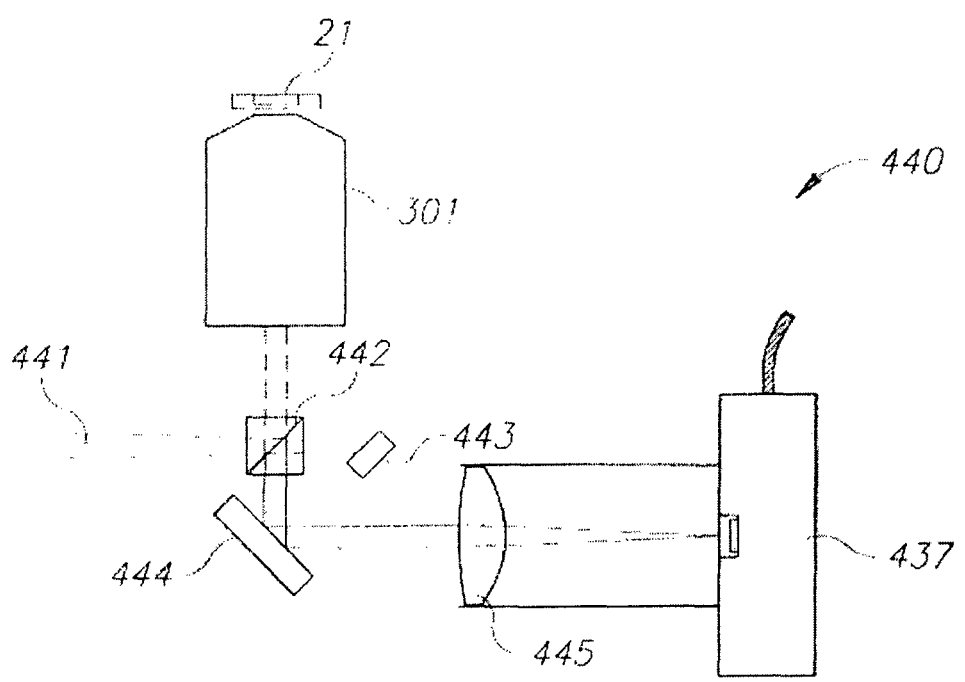
FIG. 18 is an example of an optical path for bright-field interferometric scattering microscopy.

FIG. 18 shows a configuration for bright field interferometric scattering (iSCAT) microscopy at 440. Illumination beam 441 is slightly convergent. The illumination beam 441 passes through beam splitter 442, which directs some of the illumination beam to objective lens system 18, illuminating an area of the sample 21. Beam stop 443 absorbs that part of illumination beam 441 which passes directly through the beam splitter 442. Illumination light scattered from the sample 21 interferes with illumination light reflected from an interface of the sample slide. The reflected light returns through beam splitter 442 and is reflected by mirror 444 and focused by lens 445 on imaging apparatus 437.

Figure 19A:
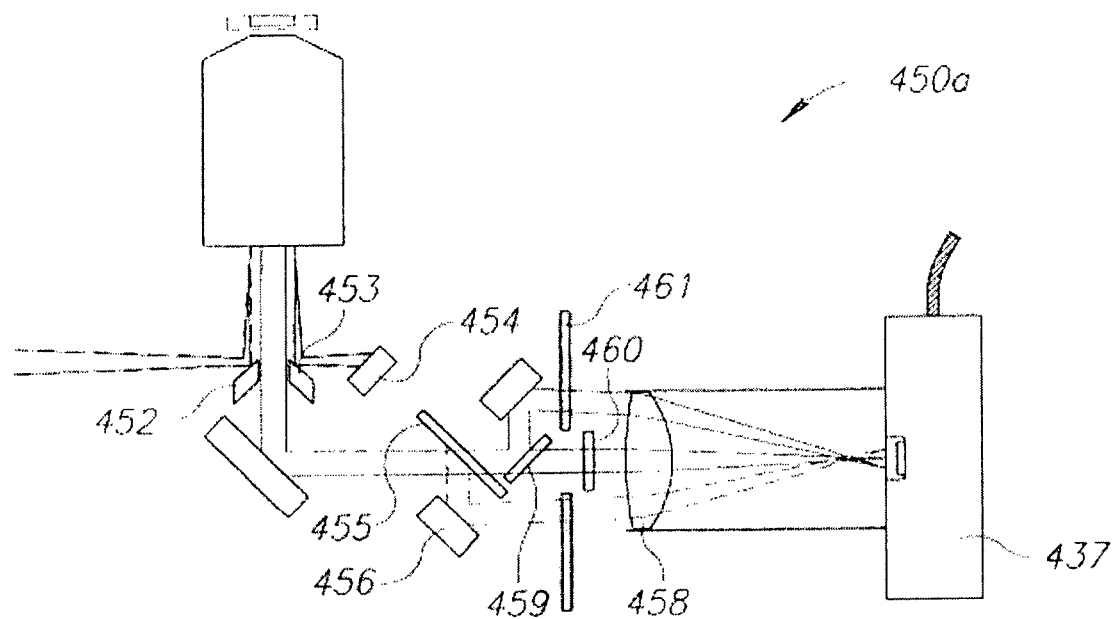
FIGS. 19a and 19b are example of optical paths for simultaneous dual-colour wide-field fluorescence microscopy and dark-field microscopy.
Figure 19B:
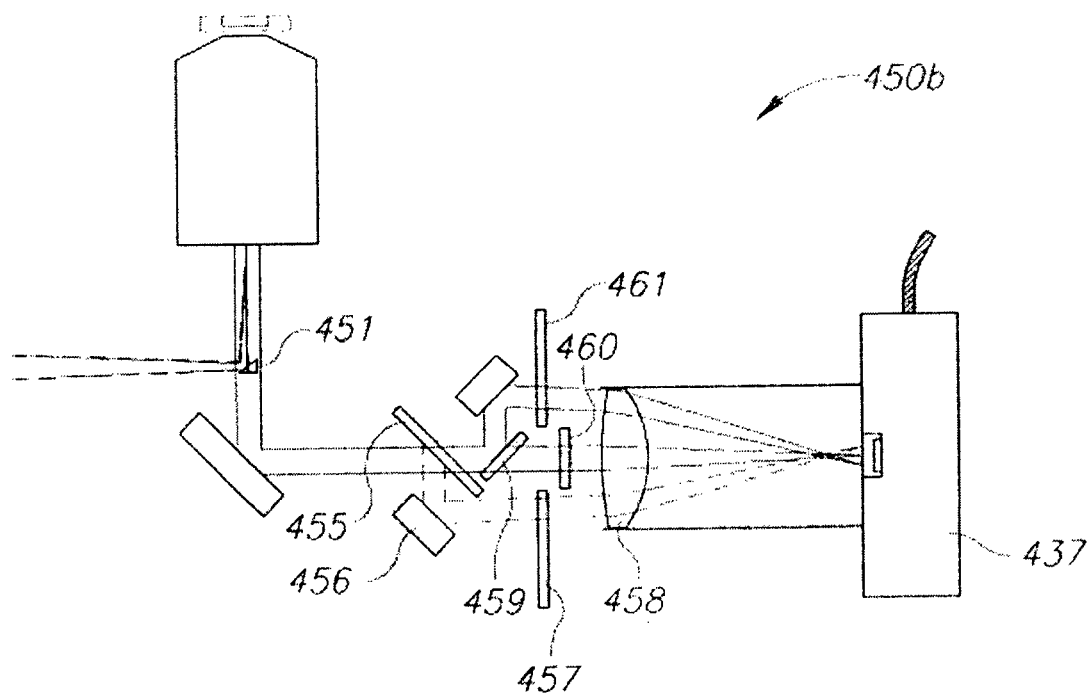

FIGS. 19a and 19b show optical paths for simultaneous dark field microscopy and multi-colour wide-field microscopy, shown at 450a, 450b respectively. In 450b, a small elliptical mirror 451 reflects the converging illumination light to the rearfocal plane of the objective on the optical axis of the objective, so that the reflected illumination light returns on the optical axis and is reflected again by mirror 451 out of the detection path. In 450a, a small mirror 452 reflects the converging illumination light to the rear focal plane of the objective on the edge of its back aperture. The illumination light is total internally reflected (TIR) at the glass/sample interface and returns at the diametrically opposite edge of the back aperture, where it is directed by another small mirror 453 into an absorbing element 454. The latter geometry requires an oil-immersion objective with sufficiently high numerical aperture.

In each alternative, a system of dichroic mirrors and filters separate the fluorescent light and scattered light from the returned light and direct the various wavelength bands to different areas of the imaging apparatus 437. Dual-band dichroic mirror 455 is selected so that fluorescent light in first and second wavelength bands passes through the dichroic mirror 455, while scattered light is reflected. The scattered light is reflected by mirror 456, through dual laser-line pass filter 457 and lens 458 and is focused on a first area of imaging apparatus 437. Long pass dichroic mirror 459 separates the fluorescent light into first and second wavelength bands, which pass through long pass filter 460 and band pass filter 461 respectively and are focused on second and third areas of the imaging apparatus 437.

Figure 20:
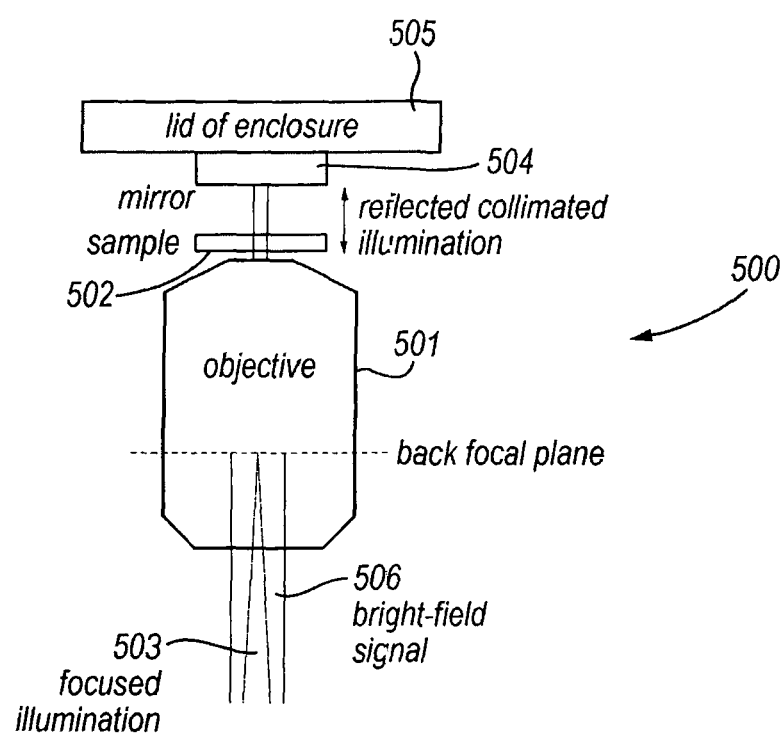
FIG. 20 is an exam pie of an optical system for epi-illuminated bright field microscopy.

A configuration for epi-illuminated transmission microscopy is shown in FIG. 20. In conventional transmission microscope systems, a light source and optical system are mounted on one side of the sample to illuminate it, and the objective collects the transmitted light on the other side of the sample. The light source and its associated optical system have been be moveable to allow for sample loading and unloading, which makes the system prone to misalignment and reduces robustness.

A suitable configuration for epi-illumination using either embodiment of the microscope described above is shown at 500 in FIG. 20. An objective lens is shown at 501, to image a sample supported on sample holder 502. A mirror 504 is located above the sample holder 502, and conveniently may be supported on a lid 505 of the microscope enclosure, so that the mirror is automatically removed from the beam path and access to the sample provided when the lid is opened. Alternatively, the mirror 504 may be supported above the sample holder 502 but may be removable to provide access to the sample, for example by being supported in a secondary support element to provide reliable positioning. The mirror 504 is preferably mounted such that the reflecting surface intersects and is perpendicular to the optical axis defined by the objective lens 501. To provide illumination, an illumination beam 503 is transmitted through the objective lens 501, is reflected from the mirror 504 and passes back through the sample. The transmitted light is shown at 506 and may be directed by the return optical system and transmitted to the detection apparatus as discussed with reference to either embodiment above. The illumination beam 503 may be focused by components in the illumination optical system to be collimated on reflection from the mirror 504, or focussed on the sample after reflection from the mirror 504.

Figure 21A:
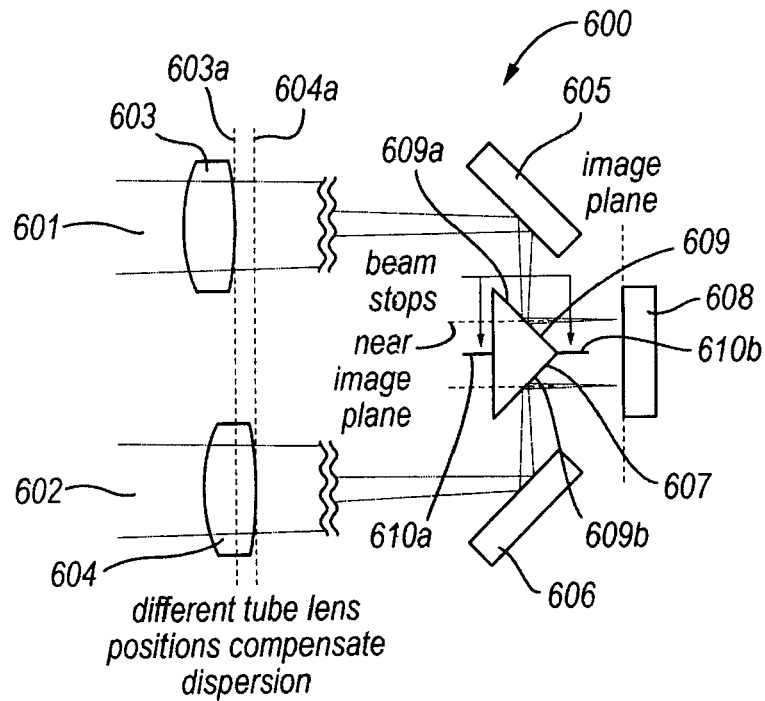
FIG. 21a is a first example of an optical system including a plurality of tube lenses.
Figure 21B:
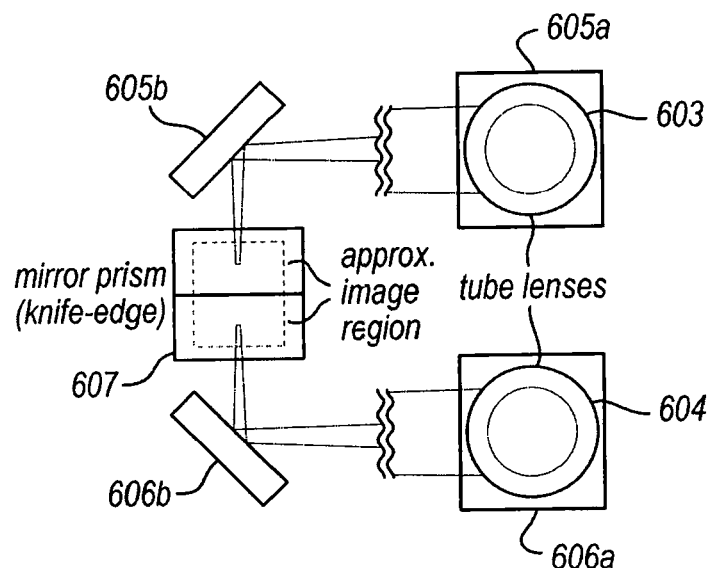
FIG. 21b is a second example of an optical system including a plurality of tube lenses.
Figure 21C:
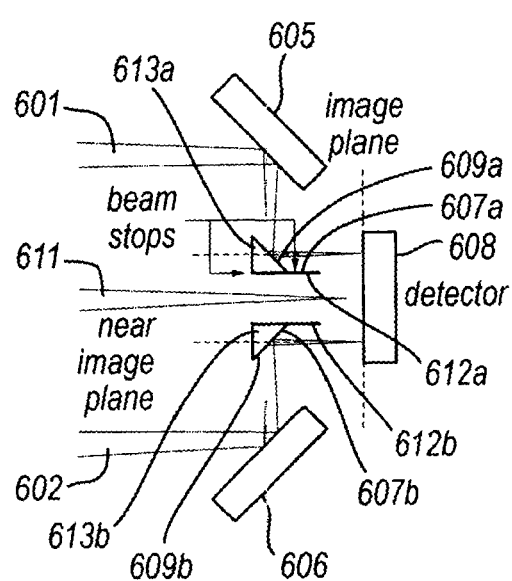
FIG. 21c is a third example of an optical system including a plurality of tube lenses.

Alternative configurations for the return optical system are shown in FIGS. 21a to 21c. In the embodiments discussed above, the illumination beam is shaped to create a rectangular illumination spot in the sample plane, and the image of the illuminated sample is similarly rectangular. This is advantageous in that multiple images can be simply imaged on the same detector without requiring formation and cropping of an intermediate image, and both images are formed at the detector using a single tube lens.

In some circumstances, the shaped illumination light can be accompanied by spurious illumination light, for instance from randomly scattered illumination light or slowly decaying illumination outside of the desired illumination area. Where the sample response to illumination light is very strong, this can lead to non-negligible tails outside of the desired rectangular area, leading to undesired overlap between adjacent image areas at the detector. Where a single tube lens is used for multiple images, for example as in FIGS. 17, 19a and 19b above, the imaging beams enter the tube lens off-axis, leading to distortion of the image field and point spread function aberrations.

Where this is undesirable, a combination of separate tube lenses and beam stops may be used. As shown in FIG. 21a, system 600 receives a pair of collimated offset beams 601, 602, for example by using any optical return system as described above. In place of a single tube lens, two tube lenses 603, 604 are used to focus beams 601, 602 respectively, and it will be apparent that the beams are essentially directed along the optical axis of the respective lens. The tube lenses 603, 604 are separately adjustable, as shown by respective planes 603a, 604a, which enable the lens positions to be varied to compensate for differing beam dispersions, for example as a result of the beams having different wavelengths causing chromatic focus shifts. Mirrors 605, 606 direct the beams to a prism assembly 607 which directs the beams such that images are formed at detector 608. The tube lenses 603, 604 are adjustable so that their image planes are at the surface of detector 608. To enable multi-focal imaging, tube lenses 603, 604 can be shifted away from their focused position to produce defocused images. The amount of defocus can be used to extract 3D position information within the sample.

The prism assembly 607 comprises a knife edge mirror prism 609, with reflecting surfaces 609a, 609b. The knife edges of the mirror surfaces effectively crop each image by not reflecting light beyond the edges towards the detector 608, removing the image parts arising from spurious illumination light outside of the desired illumination area. The images need only be cropped in the direction in which the images are tiled at the detector 608. The prism assembly optionally further includes beam stops 610a, 610b block undesired light to further improve the separation of the signal channels.

A space-saving configuration is shown in FIG. 21b, where mirrors 605, 606 are replaced by mirror pairs 605a, 606a and 605b, 606b. In this view, mirrors 605a, 606b reflect the beams leftwards from the tube lenses, to mirrors 605b, 606b and then to the prism assembly 607. Prism assembly 607 reflects the beams out of the plane of FIG. 21b. This configuration rotates each image at the detector by 180°.

A suitable configuration for three beams is shown in FIG. 21c, for example to adapt the configuration of FIG. 15a. A third beam 611 is located between beams 601 and 602, parallel thereto and focussed by its own tube lens (not shown), The prism assembly 607 is replaced by separate, spaced, prism assemblies 607a, 607b, each having a respective mirrored surface 609a, 609b and beam stop 612a, 612b to direct the desired portion of the respective beam 601, 602 to detector 608 and to block desired light. The third beam 611 may be shaped by the facing, non-reflecting surfaces 613a, 613b of the mirror prisms 607a, 607b. These surfaces may be coated with light absorbing material.

It will be apparent that these configurations may be used with or without a shaped illumination beam and overlap of signal channels is avoided by limiting the shape of the beams close to the image plane of the detector 608.

Temperature Control System

Numerous high-precision measurement techniques are adversely affected by temperature change induced dimensional changes of instrument parts. Existing solutions to this problem consist of passive temperature isolation or active temperature control of the environment around the instrument or the instrument itself. Isolation of the instrument retards heat exchange, slowing down temperature changes and thermal expansion. In the case of an oscillating external temperature, the amplitude of the temperature oscillation on the instrument is also attenuated. However, interaction with the instrument during normal operation often requires the isolation to be broken. Afterwards, temperature re-equilibration can take a significant amount of time during which the instrument is unusable or performs significantly worse.

It is known to provide active control of the temperature of the environment surrounding a microscope, for example by controlling the air temperature of the room or by providing local heating or cooling elements that are attached to the instrument at fixed locations. Relying on controlling the ambient air temperature or directed convection of temperature controlled air to equilibrate the instrument to a desired temperature is inefficient and slow, and thermal gradients of air can be generated with length-scales comparable to the size of the instrument, leading to temperature inhomogeneities across the instrument, which may be problematic.

Direct heating elements are also problematic, as they emit or absorb heat only at specific points or sides of the instrument, it can take a significant amount of time until the desired temperature is reached at specific points on the instrument, especially if these points are or have to be distant from the temperature control elements.

Figure 22A:
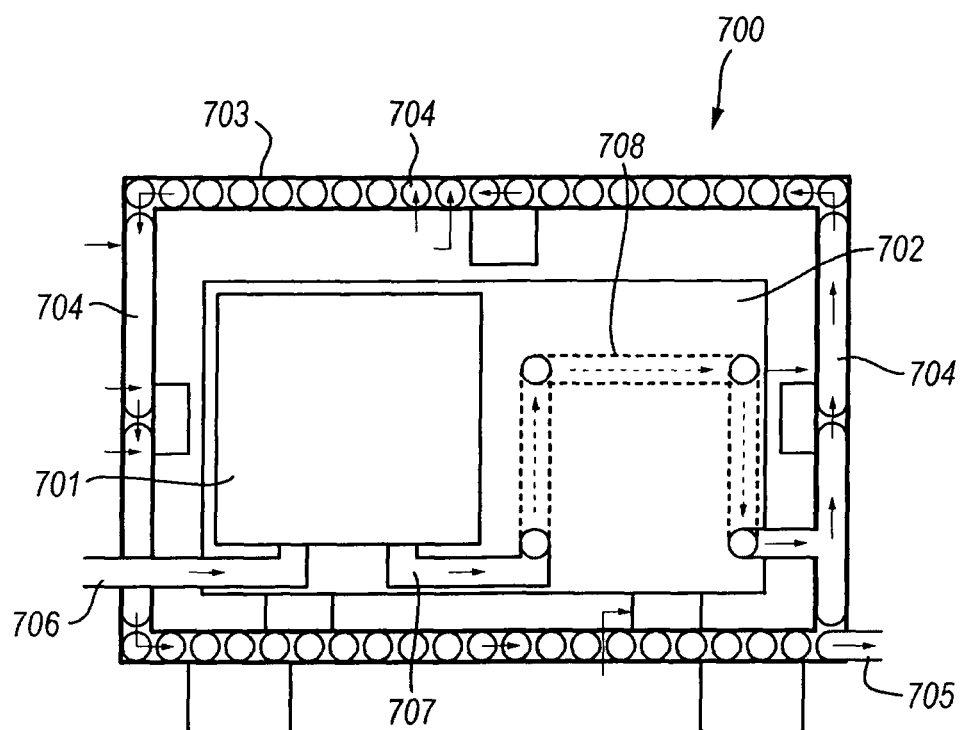
FIG. 22a is an illustration of a first temperature stability system.
Figure 22B:
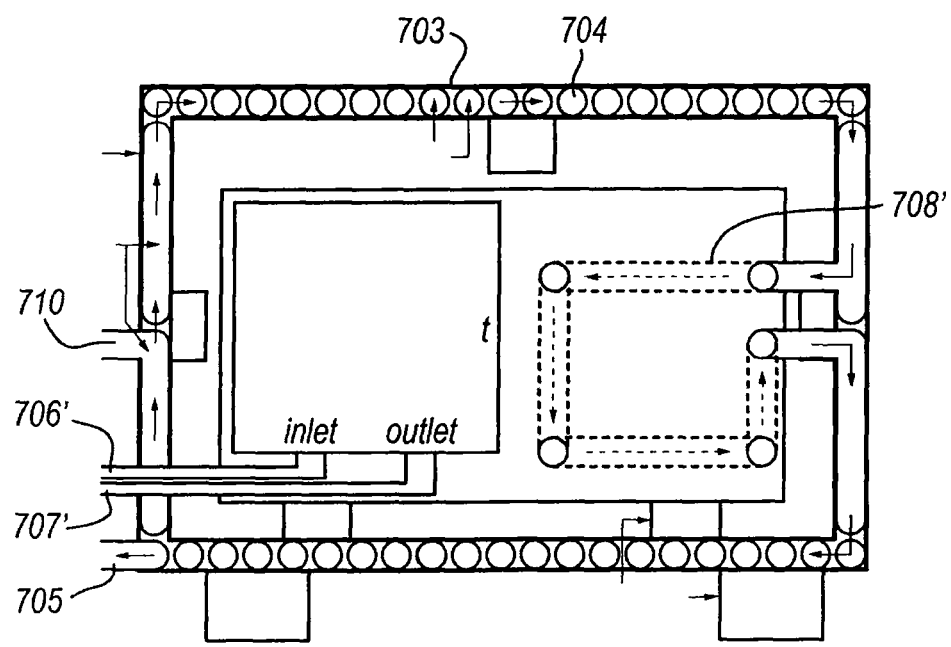
FIG. 22b is an illustration of second temperature stability system.

In the microscopes described above, temperature effects are mitigated by one or both of the enclosure 11, 205, and by the sample stage 300. However, in some circumstances more control of the instrument temperature may be desirable and a temperature control system may be provided as shown in FIGS. 22a and 22b. As seen in the figures, a microscope system is generally shown at 700 including a detector unit 701 and a microscope optics and support system generally shown at 702. The microscope optics and support system may be any configuration as described above or otherwise, and the detector unit 701 may be a camera as described above. The camera may have a detector that is cooled by a peltier element, which in turn is cooled by water. The microscope system further comprises an enclosure 703. The enclosure 703 comprises a first temperature control circuit 703a plurality of interconnected fluid-carrying channels 704 having an outlet 705. In FIG. 22a, the detector 701 has a temperature control fluid inlet 706 and a temperature control fluid outlet 707 connected to a second temperature control fluid circuit 708 on the microscope optics and support system. Fluid can then pass from the temperature control fluid circuit 708 to the interconnected channels 704. Where the detector unit 701 includes a peltier element, the cooling water will absorb heat from the hot side of the peltier element, and the water will have a certain temperature well above room-temperature. The warmer water is then pumped through temperature control fluid circuit 708 and channels 704. Since the cool side of a peltier element is usually operated with a constant temperature set point, the temperature of the hot side thermally connected to the water cannot be controlled. In this case, the temperature of the outgoing water can only be determined by the flow rate of the water. Using a closed-loop feedback system with temperature sensors at important points on the microscope, it is possible to adjust the flow, for example by using using a proportional-integral-derivative controller, such that the cooling water reaches 37° C. (or any other desired temperature) at these points.

In the alternative of FIG. 22b, the enclosure 703 and detector unit 701 are provided with separate first and temperature control fluid circuits. Inlet 706' supplies temperature control fluid to the detector unit 701, and heated fluid leaves from outlet 707'. Inlet 710 is connected to the first temperature control circuit and the microscope optics and support system 702 has a second temperature control fluid circuit 708' which is only connected to first temperature control circuit. This configuration allows direct control of the temperature of the water going into the microscope body and enclosure can result in faster temperature control. The water can be heated or cooled externally, allowing temperature set points both higher and lower than room-temperature. In this case, the flow of the water can remain constant.

Ideally, the channels 704 are placed at high density throughout any unused volume of the instrument and enclosure, such that the fluid heat source/sink is ubiquitous and heat transfer becomes spatially homogeneous. The channels can be designed such that the effective surface area for heat transfer into the instrument material is large, increasing the heat transfer rate. The internal and external structure of these channels may be designed such that minimal vibrations are generated by flow of the fluid and vibrations do not transmit to the instrument. Where the instrument has a unitary construction, the instrument body can contain integral water channels which can be positioned in close vicinity to all relevant components of the instrument.

If a fluid with larger heat capacity per volume than the bulk material of the instrument is used, such as water and aluminium, the thermal mass is increased and the thermal response is slower, which is useful when the instrument is exposed to a different temperature, for example during user interaction with the instrument. The larger thermal mass does not introduce slower response in close-loop feedback operation, because the fluid can be exchanged with a fluid a higher temperature by flow.

As shown in FIGS. 22a and 22b, the enclosure 703 includes a base. The enclosure and base may be separate elements as described in the above embodiments, in which case the base may have a separate temperature control circuit, and may be coupled to the cooling channels of the enclosure or have a separate source of temperature control fluid. When the microscope includes a primary optical support as in the second embodiment above, the temperature control fluid circuit 708, 708' may advantageously be provided as integral channels in the primary optical support element. It will be apparent that, if appropriate, a temperature control circuit may be provided in one of the enclosure and primary optical support element.

Homogeneous Light Generator

The spatial distribution of power at the output of a multi-mode fibre is approximately a top-hat distribution overlaid with a speckle pattern, and it is desirable to produce a smooth distribution of light in an illuminating beam. It is well known that periodic manipulation of the fibre can temporally smooth the speckle pattern and a homogeneous top-hat power distribution can be achieved if the measurement time is much slower than the manipulation frequency. This can be achieved using microscopic, high-frequency squeezing or stretching of the fibre using piezoelectric elements. However, this method requires expensive piezoelectric elements, high-voltage piezo drivers and signal generators and special fibres which can withstand local heating and mechanical wear at the contact points with the piezo elements. Macroscopic agitation of the fibre is also known, such as by using a vibration generating element with an unbalanced load which shakes the fibre as well as the fibre holder, but this can cause undesirable vibrations to be transferred to other components.

Figure 23:
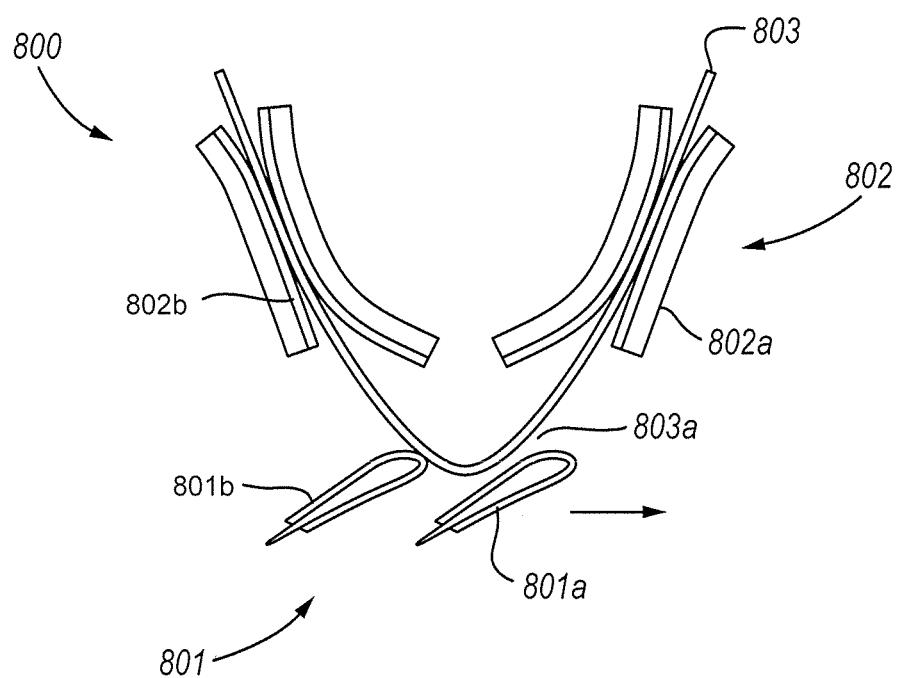
FIG. 23 is a diagrammatic illustration of a homogeneous light generator.

A homogenous light generator for use with a microscope as described herein is generally shown at 800 in FIG. 23. The homogeneous light generator comprises a fan 801 having a plurality of blades 801a. The fan 801 rotates such that the blades 801a move in direction A. A mechanical holding structure 802 supports an optical fibre 803 such at least one freehanging arc 803a of the fibre 803 is held in a position such that it can be hit by blades 801a when the fan 801 is spinning. The holding structure 802 in this example has holders 802*a* to firmly support the optical fibre 803.

To avoid mechanical wear, the blades 801*a*, holding structure 802 and the optical fibre 803 itself can be coated with an abrasion resistant layer, such as polytetrafluoroethylene or ultra-high-molecular-weight polyethylene. An abrasion resistant layer is shown at 801*b* on the fan blades and 802*b* in the holders 802. Preferably, the coating of the fibre 803 should not significantly reduce the ability of the fibre to be agitated. A firmly attached protection layer on the optical fibre 803 is preferred to protection tubes, to enable better transmittance of the agitation to the fibre core and cladding.

The fibre 803 is preferably positioned such that the plane of the unagitated arc is orthogonal to the plane in which the fan blades 801*a* will be spinning. This ensures that the arc 803*a* of fibre is hit perpendicularly and excitations within the plane of the arc are excited, as well as chaotic excursions of the fibre outside of the plane of the arc. Although the agitation is chaotic, the effective frequency of "fan rotation frequency×number of blades" can be used as a guideline to assess whether the agitation is fast enough to enable measurements at a certain frequency. The fan and mounting structure do not vibrate and they do not transmit vibrations to the rest of the system, contrast to vibration generating devices. This is because the fan blades are balanced.

Alternatively, the multimode fibre 803 may be agitated by vibrations produced by an electromagnet generating an oscillating magnetic field in the close proximity of a permanent magnet. The electromagnet may be realized as a voice coil. Multiple independent fibres and multiple loops of each fibre may be attached to the same electromagnet to increase the lengths of fibres undergoing agitation. Optionally, a second electromagnet may be attached to the apex of the loops of fibres at the diametrically opposite position with respect to the first electromagnet. The electromagnets may be driven with constant, or time-varying frequencies, or a superposition of different frequencies, or a noise signal. For example, a square wave of constant frequency may be used as the driving signal, which results in a superposition of oscillations with the frequency of the square wave and many higher order harmonics. The amplitude of the driving signal and the resulting displacement of the electromagnet must be high enough to generate sufficient agitation of the loops of fibre. An amplitude control circuit may be implemented to adjust the amplitude to a sufficient level so that the light launched from the fibre is sufficiently homogeneous and free of detectable speckles. If a second electromagnet is used, the driving signal may be in-phase, out-of-phase, or have a random phase relative to the driving signal of the first electromagnet. The relative phase can also be adjusted to cause destructive interference between the acoustic waves emitted from the oscillating electromagnets, to minimize the emitted acoustic noise from the fibre agitator.

It will be apparent that such a homogeneous light generator is suitable for any application where a smoothed light distribution is required, not limited to use with compact microscopes and illumination source modules as discussed above.

Adaptability

The compact microscope as described herein is advantageous in that it provides the most desirable aspects of wide-field imaging: low sample drift, high vibration stability, single-molecule detection sensitivity, automation and high-throughput in a form factor that is compact, robust, portable and low-cost.

The optical path was designed to provide the highest detection efficiency as possible, and to be as compact as possible. For multi-channel imaging on a single array sensor, the design does not require the formation of an image in the plane of a slit aperture which cuts the image. This is usually done to fit the image into rectangular regions on the array sensor. In contrast, the compact microscopes described above use a shaped incident beam which illuminates only the area that is going to be detected. Astigmatic lenses and a suitable aperture can be used to define the width and length of the incident beam. Compared to other channel splitting optical systems, the present system removes the need for two lenses and an adjustable slit aperture from the detection path, increasing detection efficiency and saving both space and component cost.

The provision of a separate illumination source module is advantageous in that it removes components from the microscope enclosure to permit the enclosure to be smaller, and prevents heat from the laser or supporting equipment heating the microscope enclosure and temperature-sensitive samples within the enclosure. The separate illumination source module also provides adaptability, in that to change the microscope function a different illumination source module can be easily provided and connected via an optical fibre link. Multiple connections to allow connection of the microscope to multiple illumination sections may be provided, or indeed multiple microscopes may be connected to a single illumination source module for parallel operation or reduced cost. Provision of laser sources may be continuous-wave or any combination of pulsed sources, including dual-laser excitation, triple-laser excitation, or complex pulse sequences, such as sequences with alternating single- and dual-laser excitation. Where optical fibres are used, the fibres may be manipulated in known manner, for example by heating or mechanical flexing, stretching or squeezing to produce homogeneous illumination light, or using a fan mechanism as discussed above. The control electronics may also be provided as part of the illumination source module including for example a power supply, piezo drivers, laser drivers, signalling and I/O hardware, and fibre-squeezing piezo drivers. This means that, for example, to adapt the microscope for a particular experiment, it is only necessary that the appropriate illumination source module and secondary optical support modules (where needed) are connected to the compact microscope.

Alternatively, or in addition, an illumination source module or source may be provided within the microscope enclosure if desired. Any suitable detector, or group of detectors, and corresponding return optical system, may be provided to adapt the microscope to a desired function. Although a single objective lens system is described above, the microscope may include two or more objective lens systems if required. Although the microscope described herein has an objective lens system, for some applications this may be replaced by other light collection elements, such as a reflective objective system. The modular nature of the microscope optics and objective stage allow such adaptations.

Advantageously, the microscope may be provided with sensors to detect and record measurement parameters, such as temperature, humidity, pressure, atmosphere composition, acceleration, magnetic and electric fields and location. The information from the sensors can be used in a feedback system with control systems internal or external to the microscope enclosure, to realize the exact measurement conditions desired. For example, a temperature control unit mounted on the primary optical support element could heat or cool the entire microscope (and the air within the enclosure) to a certain temperature. With appropriate temperature control, the microscope could act as an incubator, particularly where samples must be kept at a certain temperature. Known approaches with normal microscopes only use an objective heater to keep the sample at the required temperature. This inevitably causes temperature gradients in the microscope as well as the sample which lead to drift of the microscope and convection in the sample. These problems may be reduced or eliminated by maintaining the entire environment at the required temperature. The internal atmosphere may also be regulated. For example, connecting a $CO_2$ line to the microscope and a gas regulator with feedback from the environmental sensors would make the microscope act as a mammalian cell incubator. The microscope software can also use sensor information to judge the quality of the measurement, and if necessary discard invalid measurements. Recorded sensor information will also support the reproducibility of measurements.

The microscope is very adaptable and flexible in terms of illumination and detection options, specimens examined, and concentration regimes. For example, a variety of illumination sections can be used: a single-wavelength continuous laser, a pulsed excitation source with modulation in the picosecond-to second time domain, complex excitation schemes with multiple modulated lasers modulated using different ways of modulation (e.g. electronic on/off modulation, choppers, acousto-optical modulators, acousto-optical tunable filters, electro-optical modulation). In some cases, a microscope can operate even in the absence of the illumination section, e.g., in the case of chemiluminescent compounds (where the state responsible for fluorescence emission is generated by a chemical reaction). The microscope can be adapted to accommodate samples that have many forms, e.g., a solution containing luminescent compounds, a coverslip with immobilized molecules, a flow-cell containing fluorescent molecules, a slide with fixed mammalian cells or tissue samples. Although the microscope has the sensitivity to detect single molecules, it can also operate in a high-concentration mode that looks at the average intensity in a single or multiple spectral emission channels. In terms of detection, formats for point source detection e.g. confocal microscopy (where a diffraction-limited volume illuminated by a focused laser beam is focused on a point detector such as an avalanche photodiode detector, APD) or wide-field imaging (where a large area in the specimen plane is imaged on a 2D detector such a CCD, EMCCD and sCMOS camera) can be achieved. In addition to fluorescence and also fluorescence lifetime imaging capabilities, careful selection of filters in the emission path and an appropriate geometry can enable scattering measurements. The laser light wavelength or wavelength may be selected to induce changes in the sample, for example to trigger photochemical or (photo)physical processes in the sample such as photoactivation of fluorophores (by a UV laser) or stimulated emission and control of the chemical and quantum state of fluorophores in general, and local changes in temperature (by a focused IR laser. The use of multiple sources allows light of several wavelengths to be directed to a sample as needed, or to different areas of the same sample.

The microscope system is very suitable for automation with suitable control and analysis software, where the hardware control, data acquisition and storage and visualisation processes are closely integrated. Suitable software can provide automated data acquisition, real-time analysis, intelligent data analysis, so little or no user interaction is required and real-time data visualization and reporting. In a wide range of applications, many signals can be measured simultaneously in a single field of view. With the piezo friction drives, the sample can be translated by several centimetres, so that thousands of fields of view can be measured in a fully automated fashion, with data analysis and interpretation occurring in parallel. An extremely large data set can be collected and processed in a very short time. One such microscope or an array of such microscopes could therefore be used for high throughput, massively parallel multidimensional screening applications, such as for use in a pharmaceutical environment. The control electronics for the microscope, the hardware on which the data acquisition and processing software runs, stage controllers and any other control systems may be conveniently integrated in a single unit. The single unit may indeed include the illumination lasers and laser controllers. A common power supply may control the single unit, and the single unit and microscope may share a common cooling system.

The work leading to this invention has received funding from the European Research Council under the European Union's Seventh Framework Programme (FP7/2007-2013)/ERC grant agreement no 261227.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

We claim:
1. A compact microscope comprising:
an enclosure;
a support element;
a primary optical support element located within the enclosure and supported by the support element;
at least one vibration isolating mount between the support element and the primary optical support element;
a sample stage supported on the primary optical support element to support a sample;
an illumination source arranged to provide an illumination light beam for illuminating a sample;
a return optical system to receive returned light from the sample and transmit returned light to a detection apparatus, wherein the detection apparatus comprises an imaging apparatus;
wherein the return optical system is mounted on the primary optical support element, and wherein the return optical system is operable to separate returned light into at least a first wavelength band and a second wavelength band;
wherein the return optical system comprises a first tube lens arranged to focus returned light in a first wavelength band on a first area of the imaging apparatus and a second tube lens arranged to focus returned light in a second wavelength band on a second area of the imaging apparatus;

wherein the first tube lens is moveable independently of the second tube lens and the second tube lens is moveable independently of the first tube lens; and wherein:
(A) a first mirror element is arranged to deflect light from the first tube lens and a second mirror element is arranged to deflect light from the second tube lens; the compact microscope further comprising a prism assembly arranged to direct light from the first mirror element to the first area of the imaging apparatus and arranged to direct light from the second mirror element to the second area of the imaging apparatus; and/or
(B) the first tube lens is arranged, in a first mode of operation, to focus returned light in a first wavelength band on the first area of the imaging apparatus and/or the second tube lens is arranged, in a first mode of operation, to focus returned light in a second wavelength band on the second area of the imaging apparatus and the first tube lens is arranged, in a second mode of operation, to defocus returned light in a first wavelength band on the first area of the imaging apparatus and/or the second tube lens is arranged, in a second mode of operation, to defocus returned light in a second wavelength band on the second area of the imaging apparatus.

2. The compact microscope according to claim 1, wherein the first tube lens is moveable along an optical axis of the first tube lens and the second tube lens is moveable along an optical axis of the second tube lens.

3. The compact microscope according to claim 1, comprising a first mirror element arranged to deflect light from the first tube lens and a second mirror element to deflect light from the second tube lens.

4. The compact microscope according to claim 3, wherein the first mirror element is closer to the imaging apparatus than the first tube lens and the second mirror element is closer to the imaging apparatus than the second tube lens.

5. The compact microscope according to claim 3, further comprising a prism assembly arranged to direct light from the first mirror element to the first area of the imaging apparatus and arranged to direct light from the second mirror element to the second area of the imaging apparatus.

6. The compact microscope according to claim 5, wherein the first mirror element is arranged to direct light from the first tube lens toward the prism assembly and the second mirror element is arranged to direct light from the second tube lens toward the prism assembly.

7. The compact microscope according to claim 5, wherein the prism assembly comprises a knife edge mirror prism.

8. The compact microscope according to claim 7, wherein the knife edge mirror prism comprises a first reflecting surface arranged to prevent a portion of the returned light from the first tube lens reaching the imaging apparatus and a second reflecting surface arranged to prevent a portion of the returned light from the second tube lens reaching the imaging apparatus.

9. The compact microscope according to claim 1, comprising two beam stops to block stray light.

10. The compact microscope according to claim 1, further comprising:
an objective lens system,
the objective lens system being supported on the primary optical support element,
an illumination section,
an illumination optical system to direct an illumination light beam from the illumination section to the sample stage, and
a mirror disposed above the sample stage, wherein the illumination optical system is arranged to direct light through the objective lens system to the mirror.

11. The compact microscope according to claim 1, wherein the illumination source comprises a laser source.

12. The compact microscope according to claim 1, wherein the first tube lens is arranged, in a first mode of operation, to focus returned light in a first wavelength band on the first area of the imaging apparatus and/or the second tube lens is arranged, in a first mode of operation, to focus returned light in a second wavelength band on the second area of the imaging apparatus; and
the first tube lens is arranged, in a second mode of operation, to defocus returned light in a first wavelength band on the first area of the imaging apparatus and/or the second tube lens is arranged, in a second mode of operation, to defocus returned light in a second wavelength band on the second area of the imaging apparatus.

13. A compact microscope comprising:
an enclosure;
a support element;
a primary optical support element located within the enclosure and supported by the support element;
at least one vibration isolating mount between the support element and the primary optical support element;
a sample stage supported on the primary optical support element to support a sample;
an illumination source arranged to provide an illumination light beam for illuminating a sample;
a return optical system to receive returned light from the sample and transmit returned light to a detection apparatus, wherein the detection apparatus comprises an imaging apparatus;
wherein the return optical system is mounted on the primary optical support element, and the return optical system is operable to separate returned light into at least a first wavelength band and a second wavelength band;
wherein the return optical system comprises a first tube lens arranged to focus returned light in a first wavelength band on a first area of the imaging apparatus and a second tube lens arranged to focus returned light in a second wavelength band on a second area of the imaging apparatus; and
wherein the return optical system further comprises:
a first mirror pair comprising a first mirror and a second mirror to direct light from the first tube lens to the first area of the imaging apparatus and a second mirror pair comprising a first mirror and a second mirror to direct light from the second tube lens to the second area of the imaging apparatus;
wherein the first mirror of the first mirror pair has a reflecting plane perpendicular to the second mirror of the first mirror pair and the first mirror of the second mirror pair has a reflecting plane perpendicular to the second mirror of the second mirror pair.

14. A compact microscope comprising:
an enclosure;
a support element;
a primary optical support element located within the enclosure and supported by the support element;
at least one vibration isolating mount between the support element and the primary optical support element;
a sample stage supported on the primary optical support element to support a sample;

an illumination source arranged to provide an illumination light beam for illuminating a sample;

a return optical system to receive returned light from the sample and transmit returned light to a detection apparatus, wherein the detection apparatus comprises an imaging apparatus;

wherein the return optical system is mounted on the primary optical support element, and wherein the return optical system is operable to separate returned light into at least a first wavelength band and a second wavelength band;

wherein the return optical system comprises:

a first tube lens arranged to focus returned light in a first wavelength band on a first area of the imaging apparatus;

a first prism assembly arranged to direct the light from the first tube lens to the first area of the imaging apparatus;

a second tube lens arranged to focus returned light in a second wavelength band on a second area of the imaging apparatus; and a second prism assembly arranged to direct the light from the second tube lens to the second area of the imaging apparatus, wherein the first prism assembly is spaced from the second prism assembly.

15. The compact microscope according to claim 14, further comprising a first mirror element arranged to direct the light from the first tube lens to the first prism assembly and a second mirror element arranged to direct the light from the second tube lens to the second prism assembly.

16. The compact microscope according to claim 14, wherein the first prism assembly comprises a mirrored surface and the second prism assembly comprises a mirrored surface.

17. The compact microscope according to claim 14, wherein the first prism assembly comprises a beam stop and the second first prism assembly comprises a beam stop.

18. The compact microscope according to claim 14, wherein the first prism assembly comprises a non-reflecting surface and the second prism assembly comprises a non-reflecting surface.

* * * * *